(12) United States Patent
Okamoto et al.

(10) Patent No.: US 11,994,376 B2
(45) Date of Patent: May 28, 2024

(54) DISTRIBUTED VIBRATION MEASURING DEVICE AND METHOD

(71) Applicant: Nippon Telegraph and Telephone Corporation, Tokyo (JP)

(72) Inventors: Tatsuya Okamoto, Musashino (JP); Daisuke Iida, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 208 days.

(21) Appl. No.: 17/634,435

(22) PCT Filed: Feb. 13, 2020

(86) PCT No.: PCT/JP2020/005595
§ 371 (c)(1),
(2) Date: Feb. 10, 2022

(87) PCT Pub. No.: WO2021/033348
PCT Pub. Date: Feb. 25, 2021

(65) Prior Publication Data
US 2022/0326005 A1 Oct. 13, 2022

Related U.S. Application Data

(63) Continuation-in-part of application No. PCT/JP2019/032127, filed on Aug. 16, 2019.

(51) Int. Cl.
*G01B 11/16* (2006.01)
(52) U.S. Cl.
CPC ................... *G01B 11/16* (2013.01)

(58) Field of Classification Search
CPC ..................................................... G01B 11/16
See application file for complete search history.

(56) References Cited

U.S. PATENT DOCUMENTS

| | | | |
|---|---|---|---|
| 2016/0131520 A1* | 5/2016 | Martin | G01H 9/004 73/597 |
| 2021/0215532 A1* | 7/2021 | Okamoto | G01D 5/35358 |

OTHER PUBLICATIONS

T. Okamoto, et al., *Spurious Vibration Compensation in Distributed Vibration Sensing Based on Optical Frequency Domain Reflectometry*, 2018, in Proc. 26th Int. Conf. Optical Fiber Sensors, paper TuE14.
(Continued)

*Primary Examiner* — Roy M Punnoose
(74) *Attorney, Agent, or Firm* — Workman Nydegger

(57) ABSTRACT

The present disclosure provides a device that accurately measures vibration at a designated position of a sensing fiber without using digital signal processing to compensate for distance fluctuation. Digital signal processing for correcting fluctuation of a measurement distance due to a frequency offset of a beat signal due to vibration, which is a measurement target, is simplified. In the present disclosure, vibration at a designated position of the sensing fiber is accurately measured without using the digital signal processing to compensate for the distance fluctuation. A spectrum analysis length of an electrical field $E(\tau n)$ of backscattered light is set to be larger than a delay deviation $N_d$ due to frequency modulation caused by dynamic strain. An index of tolerance of vibration distribution measurement to the delay deviation $N_d$ is also clarified.

10 Claims, 15 Drawing Sheets

(56) References Cited

OTHER PUBLICATIONS

M. Froggatt and J. Moore, *High-Spatial-Resolution Distributed Strain Measurement in Optical Fiber with Rayleigh Scatter*, 1998, Appl. Opt., vol. 37, No. 10, pp. 1735-1740.

P. Healey, *Statistics of Rayleigh Backscatter from a Single-Mode Fiber*, 1987, IEEE Trans. Commun., vol. 35, No. 2, pp. 210-214.

M.E. Froggatt and D.K. Gifford, *Rayleigh Backscattering Signatures of Optical Fibers—Their Properties and Applications, 2013*, in Proc. Optical Fiber Communication Conference and Exposition and the National Fiber Optic Engineers Conference, Anaheim, United States, paper OW1K.6.

DP Zhou, et al., *Distributed Vibration Sensing with Time-Resolved Optical Frequency-Domain Reflectometry*, 2012, Opt. Exp., vol. 20, No. 12, pp. 13138-13145.

\* cited by examiner

Fig. 13
(a)
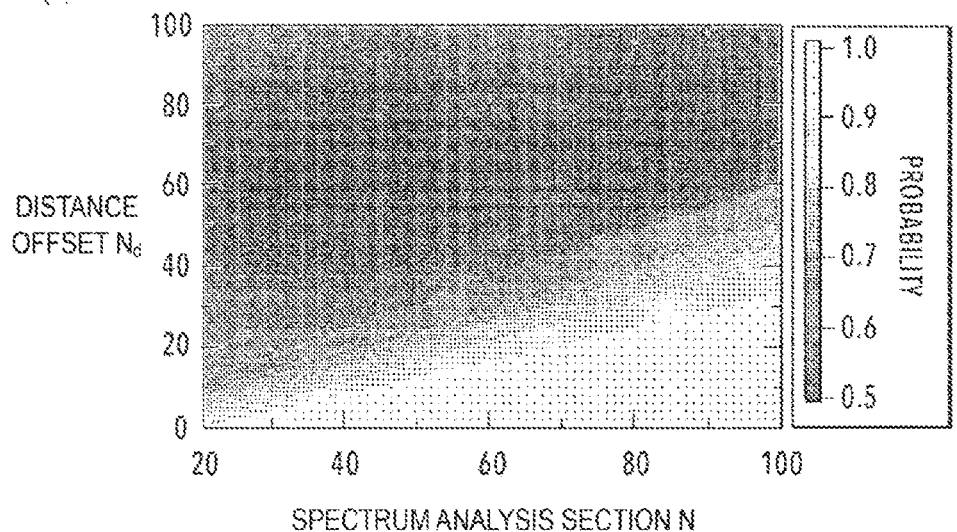
(b)
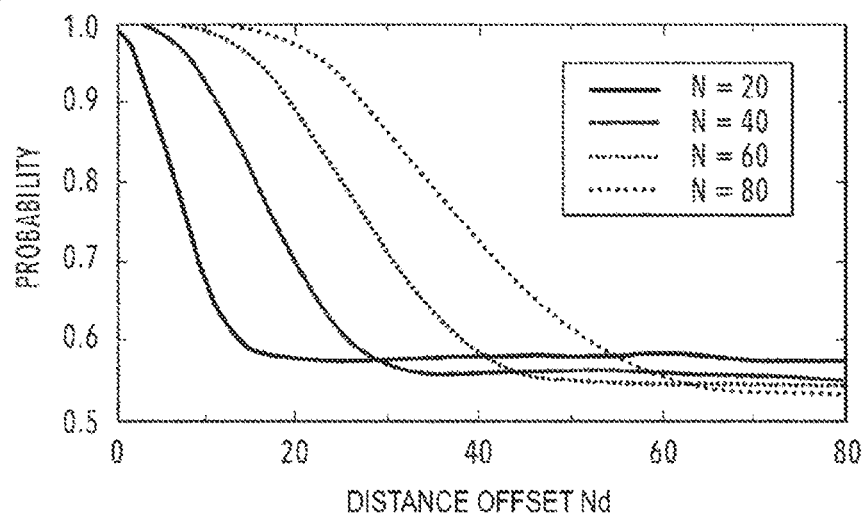

DISTRIBUTED VIBRATION MEASURING DEVICE AND METHOD

TECHNICAL FIELD

The present invention relates to optical fiber sensing, and more specifically, to a vibration distribution measurement device.

BACKGROUND ART

With an optical fiber sensing technology, it is possible to measure and detect various physical and chemical quantities such as temperature, strain, displacement, vibration, and pressure, and there are advantages such as a small diameter, low weight, flexibility, durability, and electromagnetic noise tolerance that electric sensors do not have. This can also be used for a distribution type sensor capable of measurement at a specific or freely selected position along an optical fiber. Various physical quantities of a measurement target can be measured from transmitted light, reflected light, backscattered light, and the like obtained by causing probe light to pass through a sensing fiber disposed in the measurement target. It is also possible to measure, in a distribution manner, of a temporal change (dynamic strain) of strain applied to the sensing fiber due to mechanical vibration of the measurement target at different positions in a longitudinal direction of the sensing fiber.

As a vibration distribution measurement technology, optical frequency domain reflectometry (OFDR) disclosed in NPL 1 (hereinafter, related art) is known. In OFDR, frequency swept light from a frequency swept light source is input to a sensing fiber as probe light. A beat signal between backscattered light returning from the sensing fiber and local light split from the frequency swept light is taken. A beat frequency of the beat signal corresponds to a distance to scatterers on the sensing fiber. A relationship between the beat frequency and the distance is used to measure a waveform of the backscattered light at each distance from an incidence end of the sensing fiber, that is, a distribution waveform of the backscattered light. A freely selected section of the distribution waveform is cropped, and a section of the sensing fiber corresponding thereto is defined as a strain sensor section. The Fourier transform (a square of an absolute value) of the distribution waveform in the strain sensor section indicates an optical spectrum of the backscattered light in the strain sensor section.

In OFDR, frequency sweep is repeated in a light source and probe light is repeatedly input to the sensing fiber, making it possible to capture a vibration phenomenon itself of an observation target, that is, a time waveform of vibration. For dynamic strain measurement, in the related art, frequency swept probe light is incident on the sensing fiber at a frequency higher than a frequency of vibration that can occur in the sensing fiber. Frequency modulation caused by vibration to light propagating through the sensing fiber causes a frequency offset in a beat signal observed by an optical receiver. In OFDR, the distance of the scatterers to be measured fluctuates due to the frequency offset caused by vibration that is a measurement target. Thus, the related art has proposed a scheme to compensate for the fluctuation of the distance measured through digital signal processing and accurately measuring the vibration at a designated position from a probe light incident point.

CITATION LIST

Non Patent Literature

NPL 1: T. Okamoto, D. Iida, K. Toge, and T. Manabe, "Spurious vibration compensation in distributed vibration sensing based on optical frequency domain reflectometry", 2018, in Proc. 26th Int. Conf. Optical Fiber Sensors, paper TuE14.

NPL 2: M. Froggatt and J. Moore, "High-spatial-resolution distributed strain measurement in optical fiber with Rayleigh scatter", 1998, Appl. Opt., vol. 37, no. 10, pp. 1735-1740

NPL 3: P. Healey, "Statistics of Rayleigh backscatter from a single-mode fiber", 1987, IEEE Trans. Commun., vol. 35, no. 2, pp. 210-214

NPL 4: M. E. Froggatt and D. K. Gifford, "Rayleigh backscattering signatures of optical fibers—Their properties and applications", 2013, in Proc. Optical Fiber Communication Conference and Exposition and the National Fiber Optic Engineers Conference, Anaheim, United States, paper OW1K.6

NPL 5: D P Zhou, Z. Qin, W. Li, L. Chen, and X. Bao, "Distributed vibration sensing with time-resolved optical frequency-domain reflectometry", 2012, Opt. Exp., vol. 20, no. 12, pp. 13138-13145

SUMMARY OF THE INVENTION

Technical Problem

A vibration distribution measurement device that accurately measures vibration at a designated position without using signal processing to compensate for distance fluctuation is provided. An index of tolerance of vibration distribution measurement to distance fluctuation (distance offset), which further simplifies the vibration distribution measurement device, is also clarified.

Means for Solving the Problem

An embodiment of the present disclosure is a device that measures dynamic strain of a sensing fiber, the device including an optical circuit unit that repeatedly supplies frequency swept lights to the sensing fiber, receive backscattered light from the sensing fiber, and combine local light, which is a part of a frequency swept light of the frequency swept lights, with the backscattered light, and an optical reception and analysis unit that generates a beat signal from the local light and the backscattered light, execute Fourier transform on the beat signal to obtain a backscattered light waveform, execute Fourier transform in a freely selected spectrum analysis section of the backscattered light waveform to obtain an optical spectrum, and obtain, based on the amount of spectrum shift between a spectrum obtained in reference measurement and a spectrum obtained from the backscattered light for one sweep of the frequency swept lights, a strain amount of the dynamic strain in a section of the sensing fiber corresponding to the spectrum analysis section, in which a length of the spectrum analysis section is set to be larger than a distance deviation amount $N_d$ of the spectrum analysis section caused by frequency modulation due to the dynamic strain.

Another embodiment of the present disclosure is a method of measuring dynamic strain of a sensing fiber, the method including repeatedly supplying frequency swept lights to the sensing fiber, receiving backscattered light from the sensing fiber, combining local light, which is a part of a frequency swept light of the frequency swept lights, with the backscattered light to generate a beat signal, executing Fourier transform on the beat signal to obtain a backscattered light waveform, executing Fourier transform in a freely selected spectrum analysis section of the backscattered light waveform to obtain an optical spectrum, and obtaining, based on the amount of spectrum shift between a spectrum obtained in reference measurement and a spectrum obtained from the backscattered light for one sweep of the frequency swept lights, a strain amount of the dynamic strain in a section of the sensing fiber corresponding to the spectrum analysis section, in which a length of the spectrum analysis section is set to be larger than a distance deviation amount $N_d$ of the spectrum analysis section caused by frequency modulation due to the dynamic strain.

Yet another embodiment of the present disclosure is a device that measures dynamic strain, the device including an optical circuit unit that repeatedly supplies frequency swept lights to a sensing fiber, receive backscattered light from the sensing fiber, and combine local light, which is a part of a frequency swept light of the frequency swept lights, with the backscattered light, and an optical reception and analysis unit that generates a beat signal from the local light and the backscattered light, obtain a backscattered light waveform from the beat signal, obtain an optical spectrum in a freely selected spectrum analysis section of the backscattered light waveform, and obtain a strain amount of the dynamic strain in a section of the sensing fiber corresponding to the spectrum analysis section, in which a length N of the spectrum analysis section is set with respect to an assumed distance deviation amount $N_d$ caused by the dynamic strain such that a probability of a correlation peak exceeding a noise level has a desired value when correlation measurement between a spectrum of reference measurement and the optical spectrum is performed, the desired value being approximate to 1.

Yet another embodiment of the present disclosure is a method of measuring dynamic strain, the method including repeatedly supplying frequency swept lights to a sensing fiber, receiving backscattered light from the sensing fiber, combining local light, which is a part of a frequency swept light of the frequency swept lights, with the backscattered light to generate a beat signal, obtaining a backscattered light waveform from the beat signal, obtaining an optical spectrum in a freely selected spectrum analysis section of the backscattered light waveform, and obtaining a strain amount of the dynamic strain in a section of the sensing fiber corresponding to the spectrum analysis section, in which a length N of the spectrum analysis section is set with respect to an assumed distance deviation amount $N_d$ caused by the dynamic strain such that a probability of a correlation peak exceeding a noise level has a desired value when correlation measurement between a spectrum of reference measurement and the optical spectrum is performed, the desired value being approximate to 1.

Effects of the Invention

A vibration distribution measurement device that accurately measures dynamic strain without increasing a load of signal processing is provided.

BRIEF DESCRIPTION OF DRAWINGS

FIG. 13 illustrates a probability distribution of a $N-N_d$ coordinate space for measuring a dynamic strain without the reference measurement.

DESCRIPTION OF EMBODIMENTS

A vibration distribution measurement device of the present disclosure provides measurement of a vibration distribution with a reduced load of signal processing on a sensing fiber. The vibration distribution measurement device of the present disclosure is based on OFDR and can measure dynamic strain at a freely selected position on the sensing fiber. The dynamic strain that is a measurement target means a phenomenon in which the amount of strain fluctuates with time, and includes vibration of which the amount of strain periodically fluctuates in a sinusoidal manner and aperiodic vibration of which the amount of strain randomly changes with time. That is, this is a concept including vibration including one or a plurality of frequency components. This also includes detection of one change in amount of strain, for example, when an object is placed on the sensing fiber and pressure changes at that moment.

As will be described below, dynamic strain is measured by detecting a spectrum change (shift) with respect to an optical spectrum obtained in reference measurement. Thus, for the dynamic strain in the vibration distribution measurement device of the present disclosure, all phenomena in which the amount of strain (intensity) changes with time are detection targets. Examples of a use pattern include measuring cable vibration due to wind using a sensing fiber to measure wind pressure, and detecting and reproducing sound generated around a sensing fiber for a function of a sound collecting microphone. The following vibration distribution measurement device and method of the present disclosure can be applied not only to the above-described use patterns but also to various fields.

In the related art, fluctuation of a measurement distance due to a frequency offset of a beat signal caused by vibration that is a measurement target is corrected through digital signal processing. In each sweep of an optical frequency, a distance offset at a designated position on a sensing fiber is determined and strain at a corrected distance is measured, but signal processing for determining the distance offset requires time and arithmetic power. When the vibration is measured in a distribution manner at many measurement points of the entire sensing fiber or when dynamic strain is measured over a long period of time, a load of signal processing in a vibration distribution measurement device increases. In view of the problem of the related art, the present disclosure provides a device that accurately measures vibration at a designated position without using digital signal processing to compensate for distance fluctuation.

First Embodiment

Figure 1:
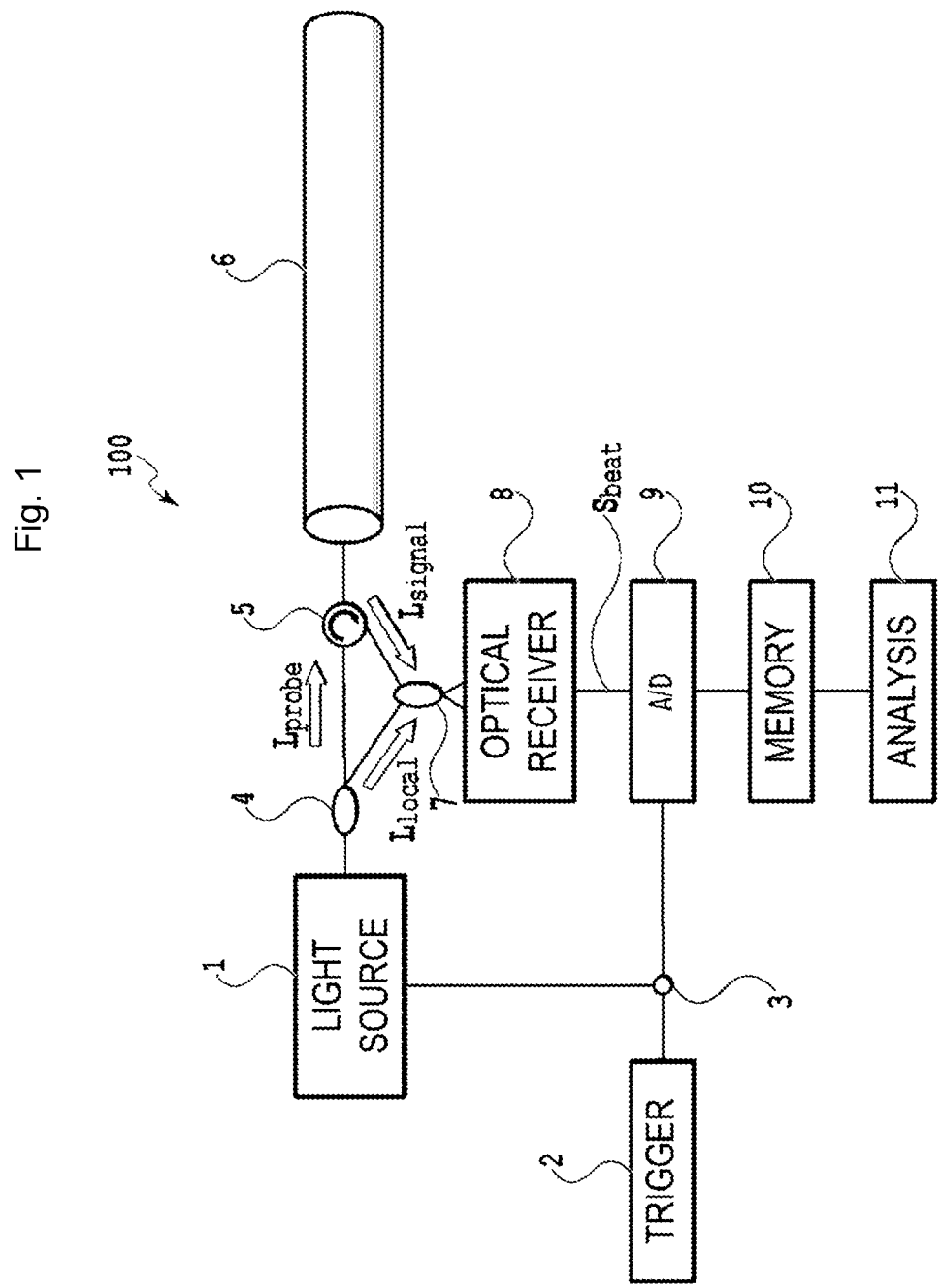
FIG. 1 is a diagram illustrating a configuration of a vibration distribution measurement device of the present disclosure.

FIG. 1 is a diagram illustrating a configuration of a vibration distribution measurement device according to the present disclosure. A vibration waveform analysis device 100 broadly divided into an optical circuit unit that supplies the frequency swept light and receives signal light, a sensing fiber 6, and an optical reception and analysis unit that converts the signal light from the sensing fiber 6 into a beat signal and analyzes the beat signal. The optical circuit unit includes a frequency swept light source 1, an optical splitter 4, an optical circulator 5, and an optical combiner 7. The frequency swept light source 1 is, for example, a laser capable of the frequency sweep at high speed, and receives a trigger signal from a trigger source 2 and repeatedly outputs the frequency swept light at a predetermined sweep period. The frequency swept light is split into two by the optical splitter 4, and one becomes probe light Lprobe that is supplied to the optical circulator 5, and the other becomes the local light Llocal that is supplied to the optical combiner 7.

The probe light Lprobe is incident on the sensing fiber 6 via the optical circulator 5 which is a directional coupling element, backscattered by scatterers in the sensing fiber 6, and returned to the incidence side. The signal light Lsignal in which backscattered light beams Lbs from respective positions of the sensing fiber 6 are superimposed exits the sensing fiber 6 and propagates to the optical combiner 7 via the optical circulator 5. Thus, the optical circuit unit repeatedly supplies the frequency swept light to the sensing fiber, receives backscattered light from the sensing fiber, and combines local light, which is a part of the frequency swept light, with the backscattered light.

The optical reception and analysis unit includes a balanced optical receiver 8, an A/D converter 9, an acquired data storage (memory) 10, and an analysis unit 11. The signal light Lsignal and the local light Llocal from the optical splitter 4 are combined by the optical combiner 7, and the beat signal Sbeat between Lsignal and Llocal is output as an electrical signal by the balanced optical receiver 8. The beat signal Sbeat is sampled by an A/D converter 9 and measured as a digital signal in synchronization with the trigger signal to the frequency swept light source 1. The measured beat signal at each time is stored in the acquired data storage 10, and the analysis unit 11 performs measurement of the vibration distribution and analysis of a vibration waveform. With the vibration distribution measurement device illustrated in FIG. 1, a backscattered light spectrum in a freely selected section of the sensing fiber 6 can be measured, and the vibration distribution and the vibration waveform can be measured and analyzed.

An operation of the optical reception and analysis unit is summarized as follows. A beat signal is generated from the local light and the backscattered light, and Fourier transform is executed for the beat signal to obtain a backscattered light waveform. Next, a Fourier transform is executed in a freely selected spectrum analysis section of the backscattered light waveform to obtain an optical spectrum, and the amount of strain of the dynamic strain in a section of the sensing fiber corresponding to the spectrum analysis section is obtained based on the amount of spectrum shift between a spectrum obtained in the reference measurement and a spectrum obtained from the backscattered light for one sweep of the frequency swept light.

The "dynamic strain" is a temporal change in amount of strain in a sensing fiber section and is obtained from the amount of strain for each sweep of the frequency swept light that is repeatedly supplied.

The entire vibration distribution measurement device 100 in FIG. 1 can be regarded as a vibration distribution measurement system. Further, the analysis of the vibration time waveform of the dynamic strain can be performed as arithmetic (calculation) processing in an analysis unit 8 in which, for example, a central processing unit (CPU), a digital signal processor (DSP), or the like is used. The present disclosure also has an aspect as an analysis program that implements a method including processing steps to be described below. Hereinafter, the fluctuation of the measurement distance due to the frequency offset of the beat signal caused by a vibration that is a measurement target, which is a common problem in the related art and the present disclosure, will be described.

Figure 2:
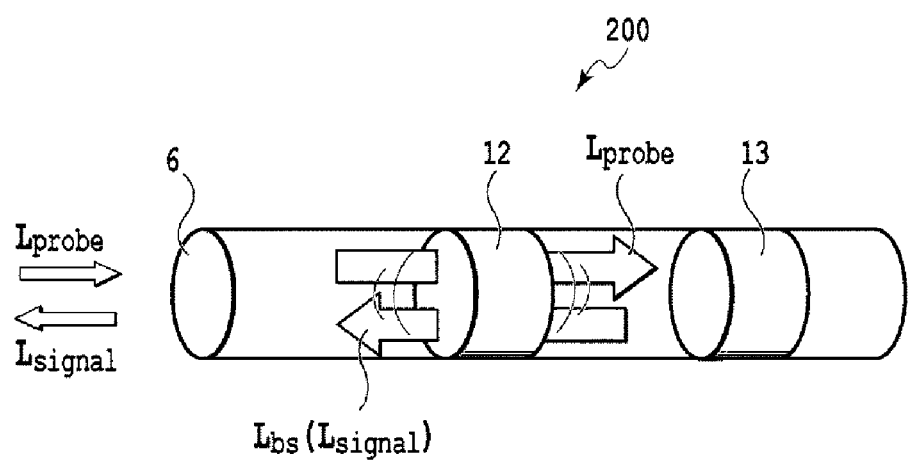
FIG. 2 is a diagram of a model of a sensing fiber assumed in a vibration distribution measurement system.

FIG. 2 is a model diagram illustrating a generation situation of the backscattered light in the sensing fiber assumed in the vibration distribution measurement system. In the sensing fiber model 200 of FIG. 2, the probe light Lprobe incident from an input end of the measurement system at a left end (not illustrated) propagates in a first dynamic strain section 12 of the sensing fiber 6. The probe light Lprobe that has passed through the first dynamic strain section 12 is backscattered by the scatterers constituting a second the dynamic strain section 13, and propagates in a reverse direction through the first dynamic strain section 12 again, and returns to an input end of the sensing fiber. A situation in which the backscattered light Lbs is emitted from the input end as the signal light Lsignal and input to the optical circulator 5 in FIG. 1 is shown.

The emitted signal light Lsignal is subjected to phase modulation, as described below, due to the mechanical vibration in the first dynamic strain section 12. According to the related art, the phase modulation to which the signal light Lsignal is subjected due to the mechanical vibration of the first dynamic strain section 12 will be described as follows.

Figure 3:
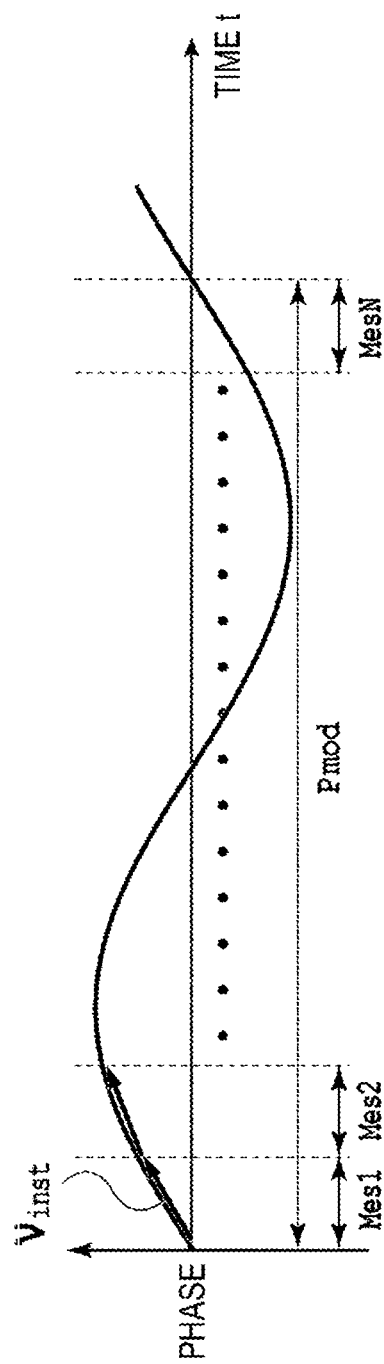
FIG. 3 is a diagram illustrating a waveform of phase modulation due to mechanical vibration in a dynamic strain section.

FIG. 3 is a diagram illustrating an example of a waveform of phase modulation due to the mechanical vibration in the dynamic strain section. In FIG. 3, a time section corresponding to one period Pmod of a phase modulation waveform generated by the mechanical vibration in the first dynamic strain section 12 illustrated in FIG. 2 is shown. In a time section of Pmod, N beat signal measurements are performed in measurement periods (Mes1 to MesN), and each of the measurement periods has a maximum of one sweep period of the frequency swept light.

A round-trip time for the probe light Lprobe to propagate in the first dynamic strain section 12, be backscattered by the scatterer in the second the dynamic strain section 13, and propagate in the first dynamic strain section 12 again, as illustrated in FIG. 2, is considered. When this round-trip time is sufficiently shorter than the period Pmod of the phase modulation, a phase modulation waveform on an outward path and a phase modulation waveform on a return path can be regarded as being the same. Thus, the amount of phase modulation to which the light propagating back and forth in the first dynamic strain section 12 is subjected is twice that of the phase modulation in the outward path. An electrical field waveform $E_{signal}(t)$ in one measurement of the signal light Lsignal propagating back and forth is expressed by Relationship (1) below.

Math. 1

$$E_{signal}(t) \propto \exp\left[j2\pi\left(v_0 + \frac{1}{2}\gamma t\right)t\right] \cdot \exp[j\phi(t)] \quad (1)$$

Here, $v_0$ indicates an initial frequency in the frequency sweep, $\gamma$ indicates a frequency sweep speed, and $\phi(t)$ indicates a waveform of phase modulation to which the light propagating back and forth is subjected. An instantaneous frequency $v_{inst.}(t)$ of the electrical field waveform expressed by Relationship (1) is expressed by Equation (2) below.

Math. 2

$$v_{inst.}(t) = v_0 + \gamma t + \frac{1}{2\pi}\frac{d\phi(t)}{dt} \quad (2)$$

In the instantaneous frequency of Equation (2), a third term on the right side corresponds to frequency modulation due to the dynamic strain. As illustrated in FIG. 3, when the measurement time (Mes1, . . . , MesN) of the beat signal is sufficiently shorter than a minimum period (the period Pmod in FIG. 3) among frequency modulations (phase modulations) generated due to a plurality of dynamic strains applied to the sensing fiber, the phase modulation according to the dynamic strain can be approximated as linear phase modulation. Because the measurement time of the beat signal is a time section of each of "Mes1" and "Mes2" in FIG. 3, when Mes1 and Mes2<<Pmod is satisfied, the phase modulation according to the dynamic strain is a frequency modulation having the amount of frequency modulation with a constant value. The amount of frequency modulation with a constant value corresponds to a slope of an arrow of the "instantaneous frequency $v_{inst.}$" in FIG. 3. Thus, when Equation (2) is further approximated, the instantaneous frequency $v_{inst.}(t)$ of the electrical field waveform is expressed as Equation (3).

Math. 3

$$v_{inst.}(t) = v_0 + \gamma t + \frac{1}{2\pi}\frac{d\phi(t)}{dt} \approx v_0 + \gamma t + v_{offset}. \quad (3)$$

In the instantaneous frequency of Equation (3), $v_{offset}$ indicates a frequency offset that is given to the signal light as a linearly approximated phase modulation. In the OFDR, the beat signal between the local light and the signal light is measured, and the beat frequency of the beat signal Sbeat is associated with a distance from an incidence end of the sensing fiber to the strain section that is a target. A beat frequency $f_{beat}$ between the signal light having the frequency offset given by Equation (3) and the local light is obtained by Equation (4) below.

Math. 4

$$f_{beat} = \gamma\frac{2z}{c} - v_{offset} = \frac{2\gamma}{c}(z - z_{offset}), \quad (4)$$

$$z_{offset} = \frac{c}{2\gamma}v_{offset}$$

In Equation (4), z is the distance, c is speed of light in the fiber, and 2z/c is a delay time between the local light and the signal light, which is the backscattered light from the second the dynamic strain section. Further, $z_{offset}$ indicates a distance offset that is caused by the frequency offset $v_{offset}$.

Figure 4:
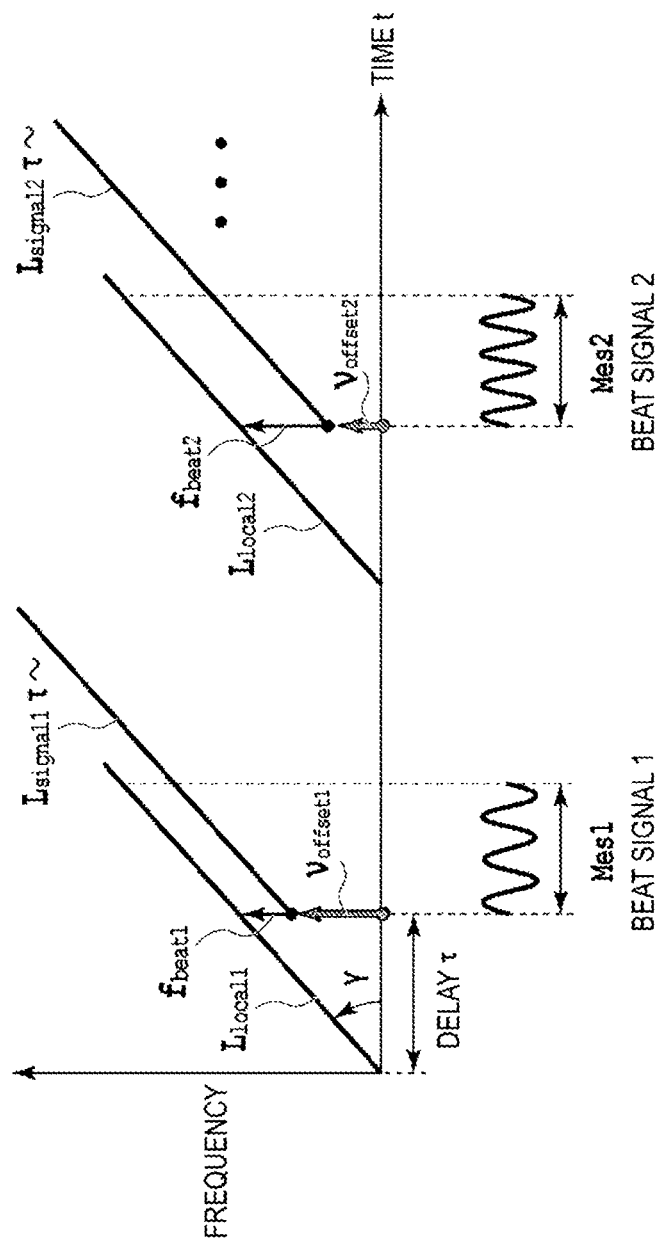
FIG. 4 is a diagram illustrating an influence of frequency modulation on signal light in a time domain.

FIG. 4 is a diagram illustrating an influence of the frequency modulation on the signal light in a time domain. In FIG. 4, a state of a temporal change in the local light Llocal, the signal light Lsignal (backscattered light), and the beat frequency fbeat of the beat signal Sbeat between the local light and the signal light for two measurements of the optical frequency sweep (measurement periods Mes1 and Mes2) is shown. In each measurement, a delay of the local light Llocal and the signal light Lsignal is $\tau$, and attention is paid only to backscattering from one dynamic strain section (strain sensor) which is a measurement target corresponding to a delay $\tau$. Thus, it should be noted that the signal light input to the optical receiver is a signal in which backscattered light beams with different delay times from all the dynamic strain sections of the sensing fiber have been superimposed. The beat signal output from the optical receiver also includes different beat frequency components from all the dynamic strain sections.

As illustrated in FIG. 4, the beat frequency of the beat signal Sbeat between the signal light Lsignal (backscattered light) and the local light Llocal in the dynamic strain section corresponding to the delay $\tau$ fluctuates as $f_{beat1}$ and $f_{beat2}$ for each measurement due to the frequency offset voffset fluctuating as $v_{offset1}$ and $v_{offset2}$ caused by the dynamic strain. A difference between $f_{beat1}$ in the beat signal 1 and $f_{beat2}$ in the beat signal 2 means that the measurement distance fluctuates in the OFDR in which the beat frequency is associated with the distance from the incidence end of the fiber to the dynamic strain section.

Figure 5:
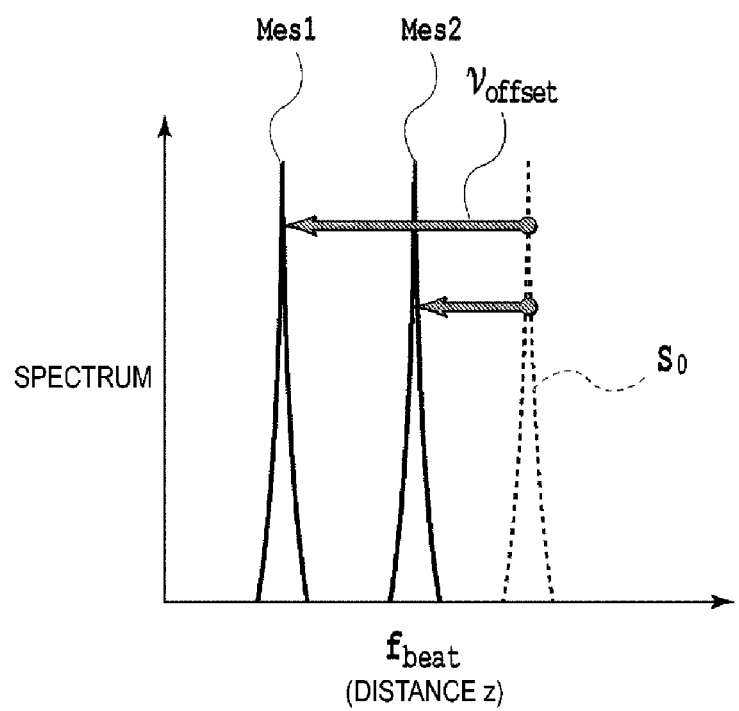
FIG. 5 is a diagram illustrating an influence of frequency modulation on signal light in a beat frequency domain.

FIG. 5 is a diagram illustrating an influence of the frequency modulation on the signal light as a spectrum change in a beat frequency domain. As illustrated in FIG. 5, a distance offset zoffset assigned to each measurement changes because of the frequency offset voffset due to the dynamic strain with respect to a peak position of the spectrum $S_0$ in a case in which there is no frequency offset. As a result, the distance to the dynamic strain section (strain sensor), which is a measurement target, is also measured with fluctuation. In dynamic strain distribution measurement using OFDR, a temporal change in the spectrum of the strain sensor due to mechanical vibration is measured at a freely selected distance on the sensing fiber. In Equation (4) above, it can be understood that the distance offset zoffset changes in each measurement due to mechanical vibration, which is the dynamic strain, and a distance to the strain sensor to be measured changes in each measurement. Measurement accuracy of the vibration distribution measurement device cannot be improved due to the fluctuation of the measurement distance.

In the related art (NPL 1), for a change in the distance offset zoffset in each measurement in which the above-described frequency sweep is repeated, the amount of distance offset is computed in each measurement, and the strain sensor section is moved by the computed amount of distance offset so that the spectrum of the backscattered light is calculated. More specifically, in an electrical field $E(\tau_n)$ of the backscattered light obtained from the beat signal, a "window section for analyzing the optical frequency response" is shifted by the computed amount of distance offset. However, compensation arithmetic with the computation of the amount of distance offset or the shift calculation in the strain sensor section requires a high arithmetic power in the analysis unit of the vibration distribution measurement device. When the vibration is measured in a distribution manner at many measurement points of the entire sensing fiber or when the dynamic strain is measured over a long period of time, a load of signal processing in the vibration distribution measurement device is increased.

The inventors found that vibration can be analyzed with high accuracy using the vibration distribution measurement device illustrated in FIG. 1 without performing distance offset compensation arithmetic processing as in the related art by newly adding an additional condition in analysis of dynamic strain of OFDR.

Because OFDR uses the frequency swept light as probe light as disclosed in NPL 2, it is possible to measure a spectrum $S(v)$ of Rayleigh backscattered light at a freely selected position on the sensing fiber.

Math. 5

$$S(v) \propto \left| \sum_{n=N_1}^{N_1+N_2} E(\tau_n)\exp(-j2\pi v \tau_n) \right|^2, \quad (5)$$

$$\tau_n = 2z_n/c$$

In the spectrum $S(v)$ of Relationship (5) above, $v$ indicates an optical frequency, $E(\tau_n)$ indicates an electrical field of backscattered light from the delay $\tau_n$ (distance $z_n = c\tau_n/2$), and c indicates a speed of light in the optical fiber, $N_1$ indicates a position at which the optical frequency response is analyzed, and $N_2$ indicates a length for analysis of the optical frequency response.

As discussed in Relationship (1) and Equations (2) to (4) described above, the spectrum of Rayleigh backscattered light linearly shifts depending on the amount of strain in a longitudinal direction of the sensing fiber. In the vibration distribution measurement device of the embodiment, reference measurement for computing the spectrum shift is first performed under a condition that a period of vibration to which the sensing fiber is subjected is sufficiently longer than a period of the frequency sweep of the probe light, for measurement of the dynamic strain in a certain sensor section. Next, a cross-correlation peak between a spectrum $S_{ref}(v)$ obtained in this reference measurement and a spectrum $S_{sig}(v)$ obtained in the n-th measurement is computed so that the amount of spectrum shift (amount of strain) is analyzed.

However, in the OFDR in which the beat frequency is associated with the distance as described above, when the dynamic strain (vibration) is applied to the sensing fiber, a section in which the strain is analyzed changes through optical frequency modulation caused by the vibration. Thus, for the spectrum $S_{ref}(v)$ obtained in the reference measurement and the spectrum $S_{sig}(v)$ obtained in the n-th measurement, a "deviation" corresponding to the distance offset occurs, and different fiber sections are assigned.

Math. 6

$$S_{ref}(v) \propto \left| \sum_{n=N_1}^{N_1+N_2} E(\tau_n)\exp(-j2\pi v \tau_n) \right|^2, \quad (6)$$

$$S_{sig}(v) \propto \left| \sum_{n=N_1+N_d}^{N_1+N_2+N_d} E(\tau_n)\exp(-j2\pi v \tau_n) \right|^2$$

Math. 7

$$N_d = T \cdot v_{offset} \quad (7)$$

In Relationship (6) and Equation (7) above, $N_d$ indicates a distance deviation amount (delay deviation amount) due to frequency modulation caused by the vibration, $v_{offset}$ indicates the amount of frequency modulation caused by the vibration, $\gamma$ indicates a frequency sweep speed of the frequency swept light, and T indicates the measurement time of the beat signal. The distance deviation amount $N_d$ is obtained through signal processing for estimating a beat frequency offset from a cross-correlation between the waveform of the backscattered light in the reference measurement and the waveform of the backscattered light in each measurement, as in NPL 1, for example.

Figure 6:
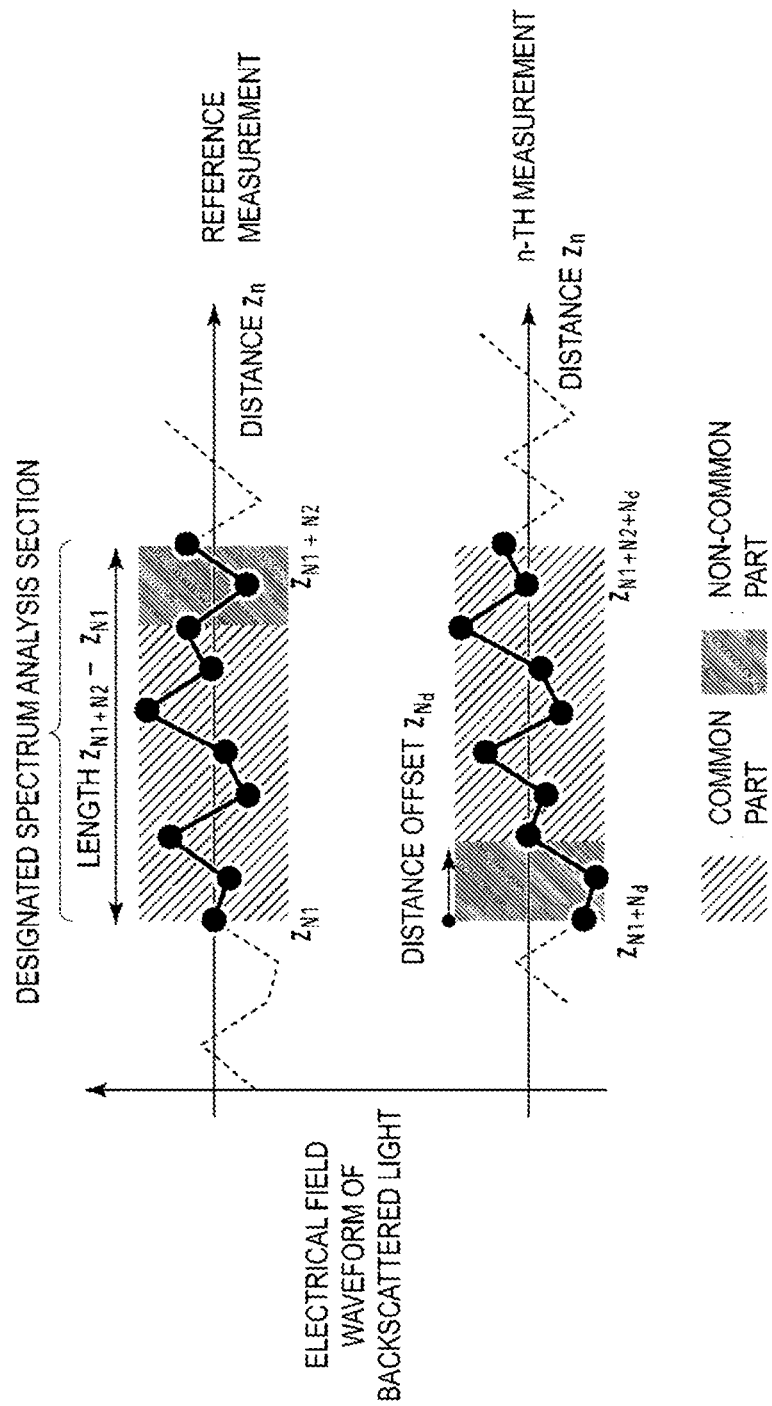
FIG. 6 is a diagram illustrating a distance deviation in a measurement section caused by frequency modulation due to vibration.

FIG. 6 is a diagram illustrating the distance deviation of a measurement section resulting from frequency modulation due to vibration. FIG. 6 illustrates an electrical field waveform of the backscattered light after the beat signal is subjected to Fourier transform, and a horizontal axis corresponds to the beat frequency. As already described, in the OFDR, the beat frequency corresponds to the distance from the incidence end of the sensing fiber. An upper waveform in FIG. 6 shows the electrical field waveform of the backscattered light in the reference measurement. Sample points in a case in which there is no distance offset (distance deviation) in the window section for analyzing the optical frequency response corresponding to the length $N_2$ are shown. A lower waveform in FIG. 6 is the electrical field waveform of the backscattered light in the n-th measurement and illustrates sample points in a state in which the distance offset $N_d$ occur. Further, when Fourier transform is performed on the window section of $N_2$, for example, the spectra $S_{ref}(v)$ and $S_{sig}(v)$ of the window section can be obtained.

As disclosed in NPL 3 or NPL 4, the electrical field $E(\tau_n)$ of the backscattered light has a distribution in a longitudinal direction of the optical fiber in a freely selected section (a section from $\tau_1$ to $\tau_N$) that follows a Gaussian distribution. Thus, for the electrical field $E(\tau_n)$ of the backscattered light, when a distance deviation occurs due to frequency modulation caused by the vibration and fiber sections (sensor sections) assigned as the spectrum analysis section in the respective measurements completely differ, a correlation between the spectra disappears. Thus, there is no correlation between the $S_{ref}(v)$ obtained in the reference measurement and the spectrum $S_{sig}(v)$ obtained in the n-th measurement, and the spectrum shift due to the dynamic strain cannot be computed.

However, when a spectrum analysis length $N_2$ of the electrical field $E(\tau_n)$ of the backscattered light is larger than the delay deviation $N_d$ due to frequency modulation caused by the dynamic strain, a spectrum correlation is maintained by a common part illustrated in FIG. 6. When a cross-correlation peak of two spectra of $S_{ref}(v)$ and $S_{sig}(v)$ given in Relationship (6) is analyzed, the following equation is obtained.

Math. 8

$$PSNR = \begin{cases} \left(1 - \frac{N_d}{N_2}\right) \cdot \left(2 + \frac{1}{N_2}\right) + \left(\frac{N_d}{N_2}\right)^2, & (N_d \leq N_2) \\ 1, & (N_d > N_2) \end{cases} \quad (8)$$

In Equation (8), a peak signal-to-noise ratio (PSNR) indicates a noise ratio of the cross-correlation peak. In Equation (8), PSNR indicates that, when the spectrum analysis length $N_2$ is larger than the distance deviation $N_d$ due to frequency modulation, this is not buried in the noise level and a cross-correlation has a peak. Thus, PSNR is an index indicating tolerance of a measurement method itself to a vibration, which is an observation target, in the vibration distribution measurement, and is one item indicating vibration measurement performance when the vibration distribution measurement using OFDR is performed.

Figure 7:
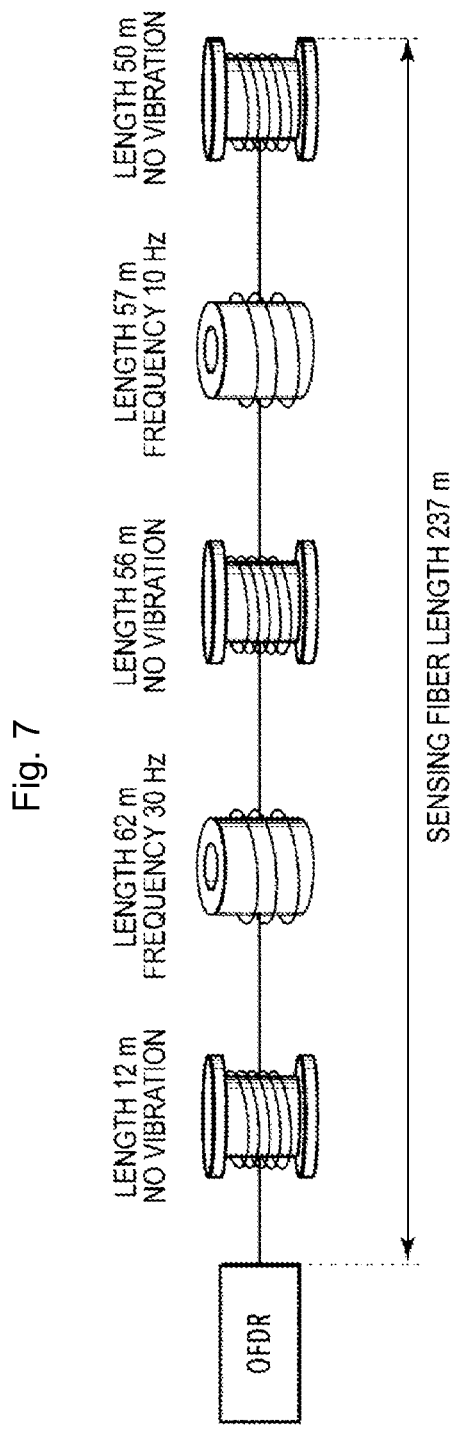
FIG. 7 is a diagram illustrating a configuration of a sensing fiber of which a vibration distribution has been analyzed.
Figure 8:
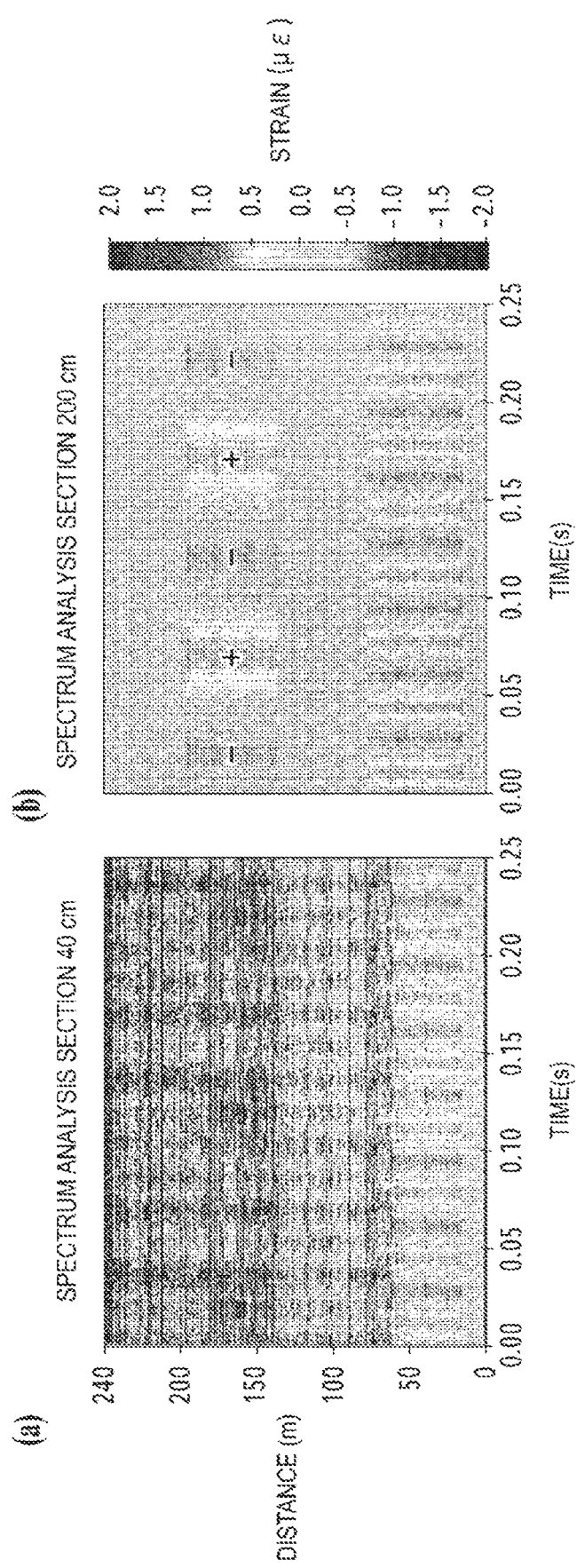
FIG. 8 is a diagram illustrating results of analyzing a vibration distribution by comparison between the related art and the present disclosure.

FIGS. 7 and 8 are diagrams illustrating a measurement example of a vibration distribution of the sensing fiber in which vibration is applied to two different positions through a comparison between the device of the related art and the device of the present disclosure. FIG. 7 is a diagram illustrating a configuration of a sensing fiber a vibration distribution of which has been analyzed. FIG. 8 is a diagram illustrating a comparison of vibration distribution analysis results between the vibration distribution measurement device of the related art and the vibration distribution measurement device of the present disclosure.

Referring to FIG. 7, a total length of the sensing fiber that is a measurement target is 237 m, and there is no vibration over 12 m from an input end on the OFDR device side at a left end of FIG. 7 (between 0 to 12 m). Subsequently, vibration at a frequency of 30 Hz is applied in a section of a length of 62 m (12 to 74 m). In the next section of a length of 56 m (74 to 130 m), there is no vibration again, and subsequently, in a section of a length of 57 m (130 to 187 m), vibration with a frequency of 10 Hz is applied. Finally, there is no vibration in a section of a length of 50 m (187 to 237 m). An end of the sensing fiber is an open end in an angled physical contact (APC) polished state.

Probe light of frequency swept light at a repetition frequency of 900 Hz was repeatedly incident on the sensing fiber having the configuration in FIG. 7 225 times from the vibration distribution measurement device illustrated in FIG. 1, a beat signal was acquired from the backscattered light, and a distribution of the dynamic strain was analyzed. A starting light frequency of the probe light was 193.6 THz, and the frequency sweep speed was 8 GHz/ms.

FIG. 8 illustrates results of analyzing the vibration distribution under the above-described measurement conditions in comparison with a vibration distribution measurement device of the related art in FIG. 8(a) and the vibration distribution measurement device of the present disclosure in FIG. 8(b). In each case, a vertical axis indicates a length of the sensing fiber, which corresponds to a length of approximately 237 m. A horizontal axis indicates time, and although color is not displayed in FIG. 8, a spatial distribution and temporal fluctuation of an intensity of the strain are shown by shade of a region represented by a coordinate plane of the distance on the vertical axis and the time on the horizontal axis. In an original diagram of a graph of FIG. 8(b), the amount of strain (με) is shown by color at a right end, but in FIG. 8, the amount is shown by only shade for reference. Further, time positions of a +peak and a −peak of the strain of the vibration at 10 Hz corresponding to the distance of 130 to 187 m in FIG. 8(b) are outlined.

In the case of the related art of (a), the length of the spectrum analysis section illustrated in FIG. 6 is 40 cm, and distance deviations $N_d$ given by a vibration source of 30 Hz and 10 Hz under the above-described measurement conditions is 14 cm and 4 cm, respectively. Compared with the length of the spectrum analysis section of 40 cm, 14 cm of the distance deviation $N_d$ given by the vibration source of 30 Hz occupies 30% or more, and it cannot be said that the length of the spectrum analysis section is sufficiently longer than the distance deviation $N_d$. In FIG. 8(a), shade corresponding to the vibration at a frequency of 30 Hz can be seen along the horizontal axis up to a distance of about 50 m, but when the distance exceeds 50 m, noise becomes predominant and a temporal fluctuation of the vibration at a frequency of 10 Hz becomes unclear. A state in which a deviation occurs in an analysis section of the electrical field waveform of the backscattered light and PSNR in Equation (8) is degraded is shown. In the vibration distribution measurement device of the related art, a distance deviation amount is caused by frequency modulation due to the dynamic strain and the longer a distance to an observation point of the sensing fiber, the more the amount of frequency modulation is accumulated. The measurement is disabled from a position at which the accumulated amount of the frequency modulation, that is, the distance deviation $N_d$ exceeds $N_2$, as illustrated in FIG. 8(a).

On the other hand, in the measurement of the vibration distribution measurement device of the present disclosure of FIG. 8(b), the length of the spectrum analysis section is 200 cm, and a condition that the spectrum analysis section is sufficiently longer than the distance deviation $N_d$ (14 cm and 4 cm) given by the vibration source of 30 Hz and 10 Hz is satisfied. Two vibrations illustrated in FIG. 7 are clearly measured in an entire region of the sensing fiber having 230 m. That is, shade corresponding to the vibration at a frequency of 30 Hz (strain intensity increases or decreases 7.5 times in 0.25 seconds, which corresponds to 30 Hz) can be observed in a range corresponding to 12 to 74 m on a vertical axis. Further, shade corresponding to vibration at a frequency of 10 Hz (strain intensity increases or decreases 5 times, which corresponds to 10 Hz) can be observed in a range corresponding to 130 to 187 m on the vertical axis. Thus, by making the spectrum analysis length $N_2$ of the electrical field $E(\tau_n)$ of the backscattered light larger than the delay deviation $N_d$ due to the frequency modulation caused by the dynamic strain in the present embodiment, the dynamic strain can be measured without PSNR deterioration.

Figure 9:
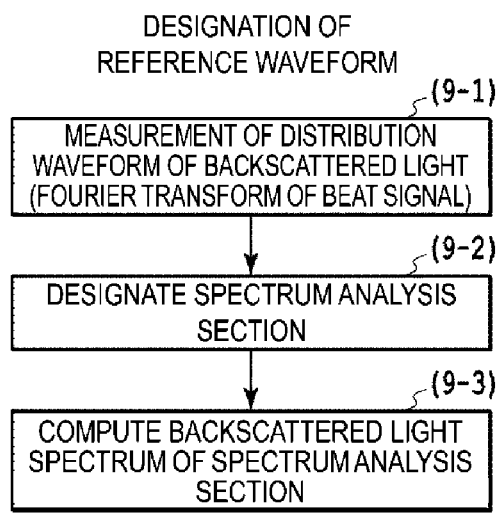
FIG. 9 is a flowchart of reference waveform designation in a vibration distribution analysis method of the present disclosure.

FIG. 9 is a flowchart illustrating a procedure for designating a reference waveform in a vibration distribution analysis method that can be performed by the vibration distribution measurement device of the present disclosure. This is a step of designating the reference waveform, which is a procedure before the measurement of the dynamic strain. The reference measurement is based on a spectrum in a state in which there is no dynamic strain in the sensing fiber. However, a waveform in a vibrated state can be used as the reference waveform as long as the waveform is a waveform measured with a signal measurement time sufficiently shorter than a minimum period of the dynamic strain applied to the sensing fiber. That is, Mes1 and Mes2<<Pmod is established, as described with reference to FIG. 3. In such a case, for example, a distribution waveform of an initial measurement result may be used as a reference waveform as it is.

Step (9-1): Measurement of the distribution waveform of the backscattered light is performed (Fourier transform of the beat signal). Here, the optical frequency response (beat signal) of the entire sensing fiber is measured.

Step (9-2): The spectrum analysis section is designated. Here, the spectrum analysis length $N_2$ of the electrical field $E(\tau_n)$ of the backscattered light is set. Here, the length $N_2$ of the spectrum analysis section of the electrical field $E(\tau_n)$ of the backscattered light is set to be longer than the delay deviation $N_d$ due to the frequency modulation caused by the dynamic strain.

Step (9-3): Measurement of the backscattered light spectrum in the designated spectrum analysis section is performed. Here, the optical frequency response in the designated spectrum analysis section is subjected to Fourier transform so that the spectrum at each distance corresponding to the spectrum analysis section is analyzed. It is possible to extract a freely selected spectrum analysis section of the backscattered light waveform and obtain a spectrum of the backscattered light in the freely selected section of the sensing fiber.

A difference from the related art is that, in step (9-2), as a new analysis condition, the spectrum analysis length $N_2$ is limited with respect to the delay deviation $N_d$.

Figure 10:
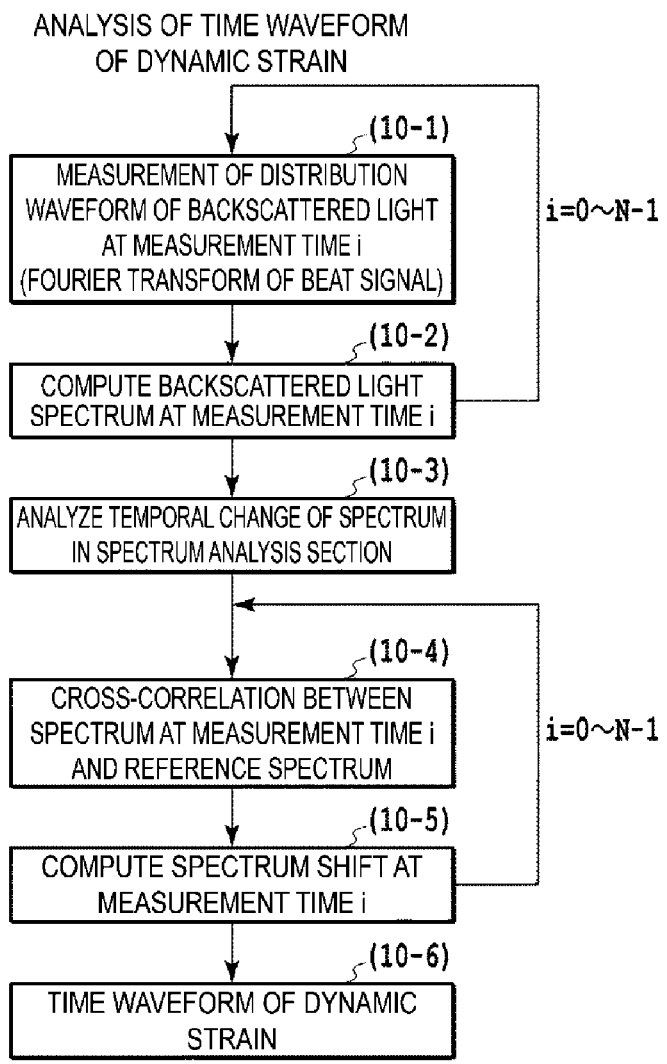
FIG. 10 is a flowchart of dynamic strain analysis of the vibration distribution analysis method of the present disclosure.

FIG. 10 is a flowchart illustrating an analysis procedure of a time waveform of the dynamic strain in a vibration distribution analysis method that can be performed by the vibration distribution measurement device of the present disclosure.

In this analysis procedure, first, the following steps (10-1) to (10-2) are repeated N times at a measurement time i=0 to N-1. N in FIG. 10 is the number of repeated measurements of OFDR (see FIG. 3).

(10-1) Measurement of the distribution waveform of the backscattered light at the measurement time i is performed (Fourier transform of the beat signal).

(10-2) The backscattered light spectrum at measurement time i is calculated.

After the above iterative step ends, a temporal change in the spectrum of the strain sensor (spectrum analysis section) is analyzed as step (10-3).

Next, the following steps (10-4) to (10-5) are repeated N times at i=0 to N-1.

(10-4) A cross-correlation between the spectrum and the reference spectrum at the measurement time i is obtained.

(10-5) A spectrum shift at the measurement time i is computed. Because the optical spectrum in a freely selected section is spectrum shifted depending on the amount of strain, the amount of spectrum shift with respect to the optical spectrum obtained in the reference measurement is analyzed every N measurements of i=0 to N-1.

Finally, as step (10-6), the time waveform of the dynamic strain is obtained in a range of time i=0 to N-1 from results of the spectrum shifts of steps (10-4) to (10-5) and the procedure is ended.

The Fourier transform arithmetic processing and the calculation processing of the spectrum and the amount of spectrum shift in the above-described steps of FIGS. 9 and 10 can be performed after pieces of beat signal data at a certain number of times are accumulated by the acquired data storage 10 of the vibration distribution measurement device in FIG. 1 and a series of measurements ends. It should be noted that it is not always necessary to perform the above-described arithmetic processing in real time in synchronization with the application of actual frequency swept light to the sensing fiber.

Thus, a method of measuring a dynamic strain of a sensing fiber of the present disclosure in the device illustrated in FIG. 1 includes repeatedly supplying frequency swept lights to the sensing fiber, receiving backscattered light from the sensing fiber, combining local light, which is a part of a frequency swept light of the frequency swept lights, with the backscattered light to generate a beat signal, executing Fourier transform on the beat signal to obtain a backscattered light waveform, executing Fourier transform in a freely selected spectrum analysis section of the backscattered light waveform to obtain an optical spectrum, and obtaining, based on the amount of spectrum shift between a spectrum obtained in reference measurement and a spectrum obtained from the backscattered light for one sweep of the frequency swept lights, a strain amount of the dynamic strain in a section of the sensing fiber corresponding to the spectrum analysis section, in which a length of the spectrum analysis section is set to be larger than a distance deviation amount $N_d$ of the spectrum analysis section caused by frequency modulation due to the dynamic strain.

The respective steps of FIGS. 9 and 10 are executed by a program on a computer constituting the analysis unit 11 in FIG. 1, but the analysis unit 11 in FIG. 1 and optionally the acquired data storage 10 can be disposed at places away from the components 1 to 9 in FIG. 1 and connected to a network.

The vibration distribution measurement system and the vibration distribution measurement device according to the embodiment of the present invention can be implemented by a computer and a program that execute the above analysis method, and the program can be recorded on a recording medium or provided through a network.

Although the processing for calculating the spectrum shift is included in the above-described embodiment, a more detailed condition for setting the length N of the spectrum analysis section with respect to the distance deviation amount $N_d$ will be clarified in the next embodiment.

Second Embodiment

In the vibration distribution measurement device of the first embodiment described above, the dynamic strain in the sensing fiber can be performed with high accuracy under the condition that the length of the spectrum analysis section for the backscattered light is larger than the delay deviation $N_d$ due to the frequency modulation caused by the dynamic strain. However, a reference waveform is obtained (FIG. 9), the delay deviation $N_d$ caused by a vibration phenomenon is estimated as the distance offset (steps 10-4 to 10-5), the spectrum analysis section is shifted by $N_d$, and the dynamic strain is calculated (steps 10-6). Calculations related to these distance offsets require processing time.

The inventors further examined a method capable of further simplifying the arithmetic processing in the vibration distribution measurement device and shortening the processing time. A relationship between the length of the spectrum analysis section and the delay deviation $N_d$, which was focused on in the vibration distribution measurement device of the first embodiment, was examined in further consideration of statistical properties of the Rayleigh backscattered light, and a concept of "tolerance to the distance offset" was further proposed. In the vibration distribution measurement device of the second embodiment to be described below, a concept of "tolerance" will be described in detail, and a more simplified vibration distribution measurement device and method configured based on the tolerance will be described. In the following description, the delay deviation (delay deviation) $N_d$ is referred to as the distance offset $N_d$, but these are used as having the same meaning. It should also be noted that the spectrum shift on the optical frequency in the spectrum analysis of the first embodiment corresponds to the distance offset $N_d$ converted into a distance on the sensing fiber.

In measurement of the backscattered light in OFDR, an influence of occurrence of the distance offset (delay deviation) in a measurement section that is a target due to the vibration of the measurement target is ascertained more quantitatively. Thus, the properties of Rayleigh backscattered light were statistically analyzed so that "tolerance" of the dynamic strain measurement to the distance offset $N_d$ was obtained. A theoretical value of the "tolerance" was described by two parameters including the "length of spectrum analysis section" and the "distance offset $N_d$", as a probability that a vibration can be measured correctly even when there is the distance offset.

Figure 11:
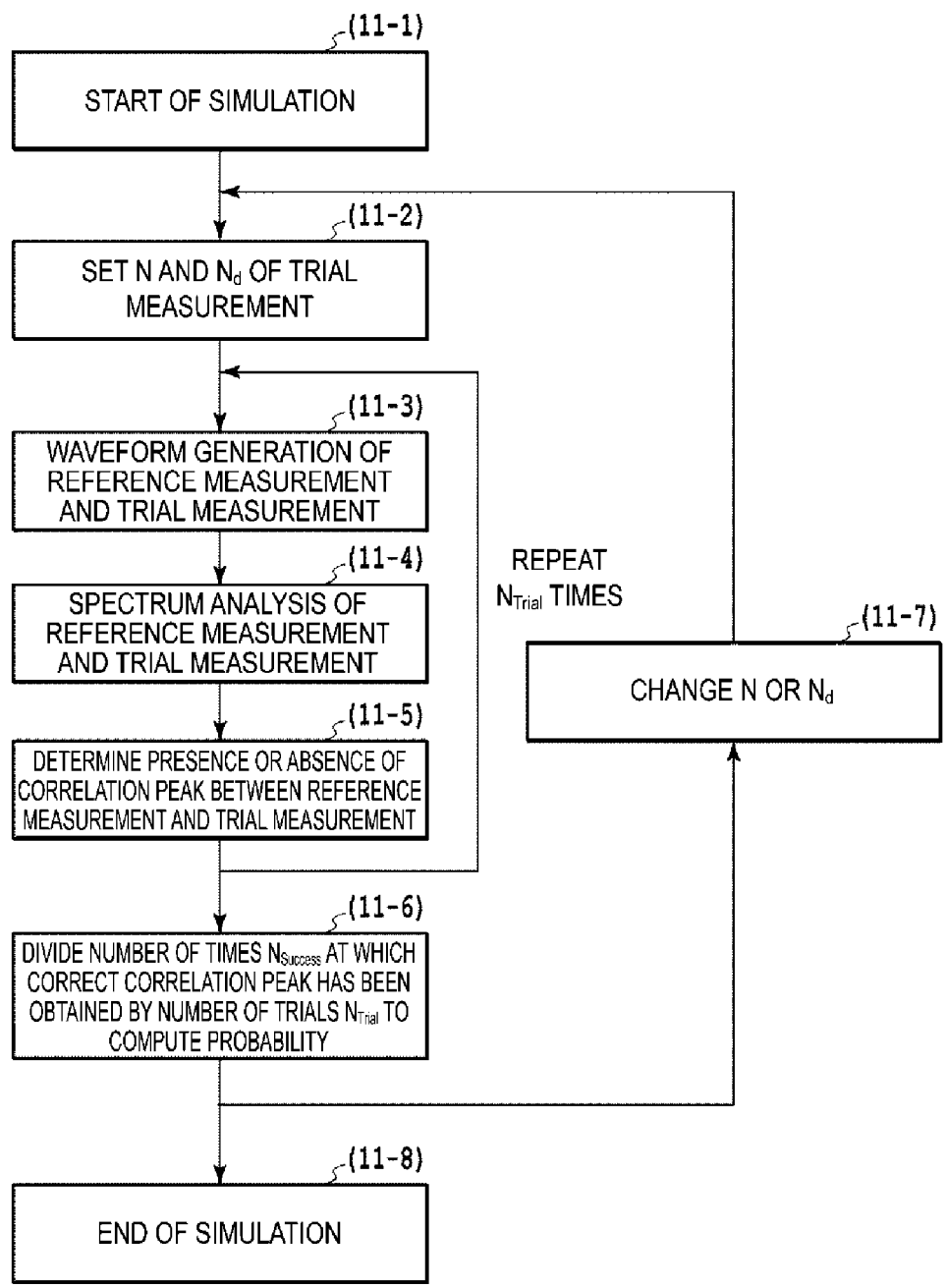
FIG. 11 is a flowchart for obtaining a theoretical value of tolerance of dynamic strain measurement.

FIG. 11 is a flowchart for obtaining a theoretical value of tolerance of the dynamic strain measurement to the distance offset $N_d$. In the flowchart of FIG. 11, an electrical field waveform of the Rayleigh backscattered light is generated by a different combination of "spectrum analysis section length N" and the "distance offset $N_d$" by simulation. In an optical spectrum corresponding to the generated electrical field waveform, a probability of a correlation peak value between the reference measurement and the trial measurement exceeding a correlation noise level was obtained. In the simulation, trial measurement in which a correlation peak was calculated for about 200000 combinations as different combinations of N and $N_d$ was repeated. With the trial measurement, a probability that the correlation peak can be detected was obtained with N and $N_d$ as parameters.

Figure 12:
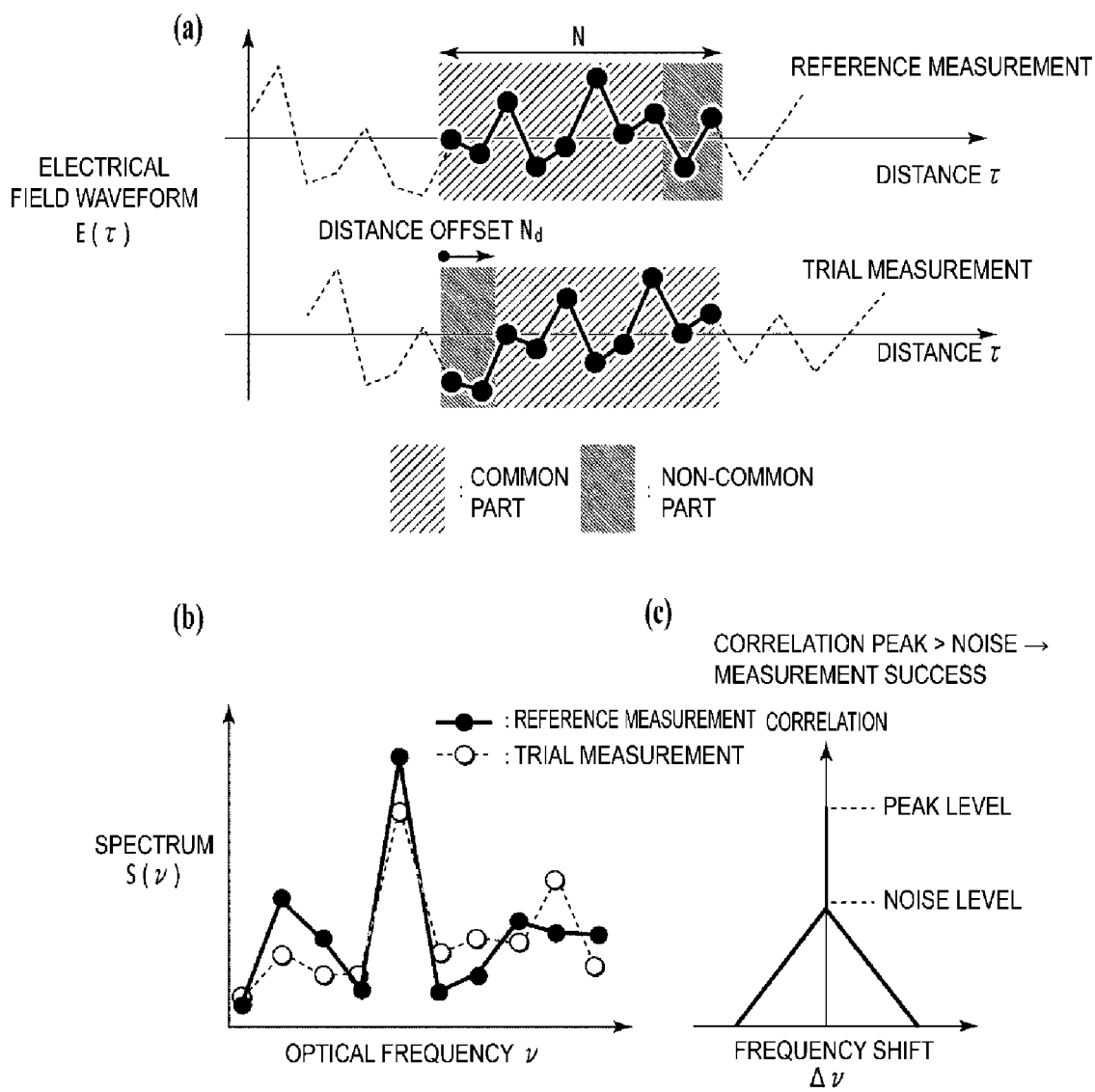
FIG. 12 is a schematic diagram illustrating processing for obtaining a theoretical value of tolerance of the dynamic strain measurement.

FIG. 12 is a diagram schematically illustrating processing in each of the steps of simulation regarding the tolerance of the dynamic strain measurement. Hereinafter, a simulation method will be described with reference to the steps of FIG. 11 and the schematic diagrams of descriptions of processing operations of FIG. 12 alternately. As will be described below, FIG. 12(a) corresponds to step 11-3 in FIG. 11, FIG. 12(b) corresponds to step 11-4 in FIG. 11, and FIG. 12(c) corresponds to step 11-5 in FIG. 11.

Referring back to FIG. 11, simulation is started in step 11-1, and N and $N_d$ for one trial measurement are set in step 11-2. In next step 11-3, a reference waveform and a trial measurement waveform are generated. That is, an electrical field waveforms $E(\tau)$ for each of the reference measurement and the trial measurement are generated, as illustrated in FIG. 12(a). Here, the electrical field waveform was generated as a random variable whose average value of an amplitude is 0 and follows a normal distribution. The distance offset $N_d$ was set for a certain length N of the spectrum analysis section in each of the reference measurement and the trial measurement. The distance offset $N_d$ was randomly set either before or after the spectrum analysis section for the reference measurement and the trial measurement. Thus, there are $N_d$ non-common parts between the two generated waveforms.

Then, in step 11-4 of FIG. 11, each of the electrical field waveforms in the reference measurement and the trial measurement is spectrally analyzed and the spectrum $S(v)$ is obtained. That is, the spectrum of the reference measurement and the spectrum of the trial measurement are obtained, as illustrated in FIG. 12(b). When no distance offset occurs, the two spectra mostly match, as illustrated in FIG. 12(b). When the distance offset occurs, spectra in different sections of the sensing fiber are analyzed and spectrum shapes do not match.

In step 11-5 of FIG. 11, a spectrum correlation is analyzed for each of the spectra in the reference measurement and the trial measurement, and the presence or absence of a correlation peak is determined. That is, an optical frequency shift $\Delta v$ is obtained from the spectrum of the reference measurement and the spectrum of the trial measurement, as illustrated in FIG. 12(c). A correlation value calculated here exceeds the noise level as illustrated in FIG. 12(c) when there is a common part between an electrical field waveform of the reference measurement and an electrical field waveform of the trial measurement, and a peak of the correction value appears. A case in which a correlation peak level exceeds the noise level is defined as a state in which vibration can be measured correctly. When the correlation peak level exceeds the noise level, the amount of strain can be measured correctly and thus, it is possible to obtain the amount of strain applied to the sensing fiber without shifting the spectrum analysis section according to the amount of distance offset. In one trial measurement, a determination is made as to whether the correlation peak level exceeds the noise level, the trial measurement is repeated ($N_{Trial}$ times) for one combination of N and $N_d$, and a determination is made as to whether the vibration measurement is correctly performed. Simulation of the probability distribution in which vibration can be measured correctly without the reference measurement in an N-$N_d$ space can be performed through repetition of steps 11-3 to 11-5.

Referring back to FIG. 11, after the presence or absence of the correlation peak is determined in step 11-5, the processing returns to step 11-3, and steps 11-3 to 11-5 are repeated $N_{Trial}$ times. When repetition of the total number of trials $N_{Trial}$ ends, a probability distribution in which vibration can be correctly measured at a certain point in the N-$N_d$ space without the reference measurement is calculated in step 11-6. Specifically, the number of times $N_{Success}$ at which the correlation peak can be detected is divided by the number of trials $N_{Trial}$ so that the probability is computed. After the probability is calculated, $N_d$ or N is changed in the next step 11-7 and the processing returns to step 11-2. In step 11-7, a combination of $N_d$ and N is determined in a range and particle size that are targets, and the probability is obtained at all points in the N-$N_d$ coordinate space. After all combinations of $N_d$ and N are set and the probability is obtained, the simulation ends in step 11-8.

As described with reference to FIGS. 11 and 12, it is possible to obtain the probability distribution in which vibration can be measured correctly without the reference measurement in the combination of N and $N_d$. When the distance offset $N_d$ assumed in the measurement target can be known in advance before measurement, the length N of the spectrum analysis section is simply selected appropriately based on this probability distribution, making it possible to measure the vibration correctly without the reference measurement.

FIG. 13 is a diagram illustrating a probability distribution with which vibration (dynamic strain) can be correctly measured without the reference measurement using N and $N_d$ as parameters. FIG. 13(a) is a diagram illustrating the probability distribution for the combination of N and $N_d$ in shades. A horizontal axis indicates the length N of the spectrum analysis section, and a vertical axis indicates the distance offset $N_d$. It is difficult to see because the original color diagram is converted into monochrome shade, but a distribution is such that a probability value P gradually increases from 0.5 to 1.0 from an upper left corner to a lower right corner of a graph. FIG. 13(b) is a diagram illustrating a relationship between the distance offset $N_d$ and a probability P with which vibration can be measured correctly without the reference measurement, with the length N of the spectrum analysis section as a parameter.

Referring to FIG. 13(a), it can be seen that, when the length N of the spectrum analysis section is larger, the correlation peak can be detected with a probability P=1 for a longer distance offset $N_d$. That is, when N is set to be larger, the tolerance to distance offset increases, and the probability with which the vibration (the dynamic strain) can be measured correctly without the reference measurement is increased. More specifically, referring to FIG. 13(b), in the measurement of the dynamic strain that is a target, for example, when the assumed distance offset is $N_d$=10 cm, the probability P that can be read from a curve of N=80 cm is equal to or higher than 0.99 and is substantially close to 1. FIG. 13 illustrates that, when $N_d$=10 cm is assumed in the measurement of the target and N is set to 80 cm or more, the vibration can be correctly measured without the reference measurement with a probability of 99% or more. When $N_d$ having different values are assumed, the length N of the spectrum analysis section in which the vibration can be correctly measured with a predetermined probability value P without the reference measurement can be determined according to each figure of FIG. 13.

A distribution of the probability value P in the N-$N_d$ coordinate space illustrated in FIG. 13 is obtained by simulations described in FIGS. 11 and 12, but indicates tolerance to the distance offset $N_d$ in the dynamic strain measurement, that is, the vibration distribution measurement. With only two parameters, N and $N_d$, it is possible to know limit conditions under which vibration can be measured correctly without the reference measurement, and limit conditions can be used for design of the tolerance to the distance offset $N_d$ in the vibration distribution measurement. When the length N of the spectrum analysis section is set so that the reference measurement is unnecessary, this means that the computation of the distance offset becomes unnecessary. Next, when N is selected based on a theoretical probability value P in the N-$N_d$ coordinate space illustrated in FIG. 13, the validity as an index of tolerance to $N_d$ of the probability distribution obtained by simulation is verified.

Figure 14:
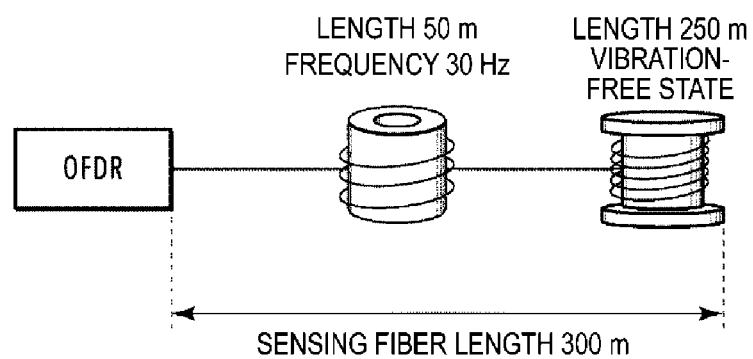
FIG. 14 is a configuration diagram of a vibration system that verifies the validity of a probability value in the $N-N_d$ coordinate space.

FIG. 14 is a diagram illustrating a configuration of a vibration system used for verification of the validation as a tolerance index of theoretical probability value in the N-$N_d$ coordinate space. A total length from a signal input end of the OFDR device to the end of the sensing fiber, which is a measurement target, is 300 m and a vibration at a frequency of 30 Hz is applied in a section (0 to 50 m) of 50 m from the input end. In the next section (50 to 300 m) of the length of 250 m, there is no vibration. The end of the sensing fiber is an open end in an angled physical contact (APC) polished state. In the vibration system of FIG. 14, the distance offset assumed in a vibration at a frequency of 30 Hz in a first section is 26 cm ($N_d$=17). $N_d$=17 is a dimensionless amount obtained by dividing the distance offset of 26 cm by a spatial resolution of OFDR of 1.5 cm.

Figure 15:
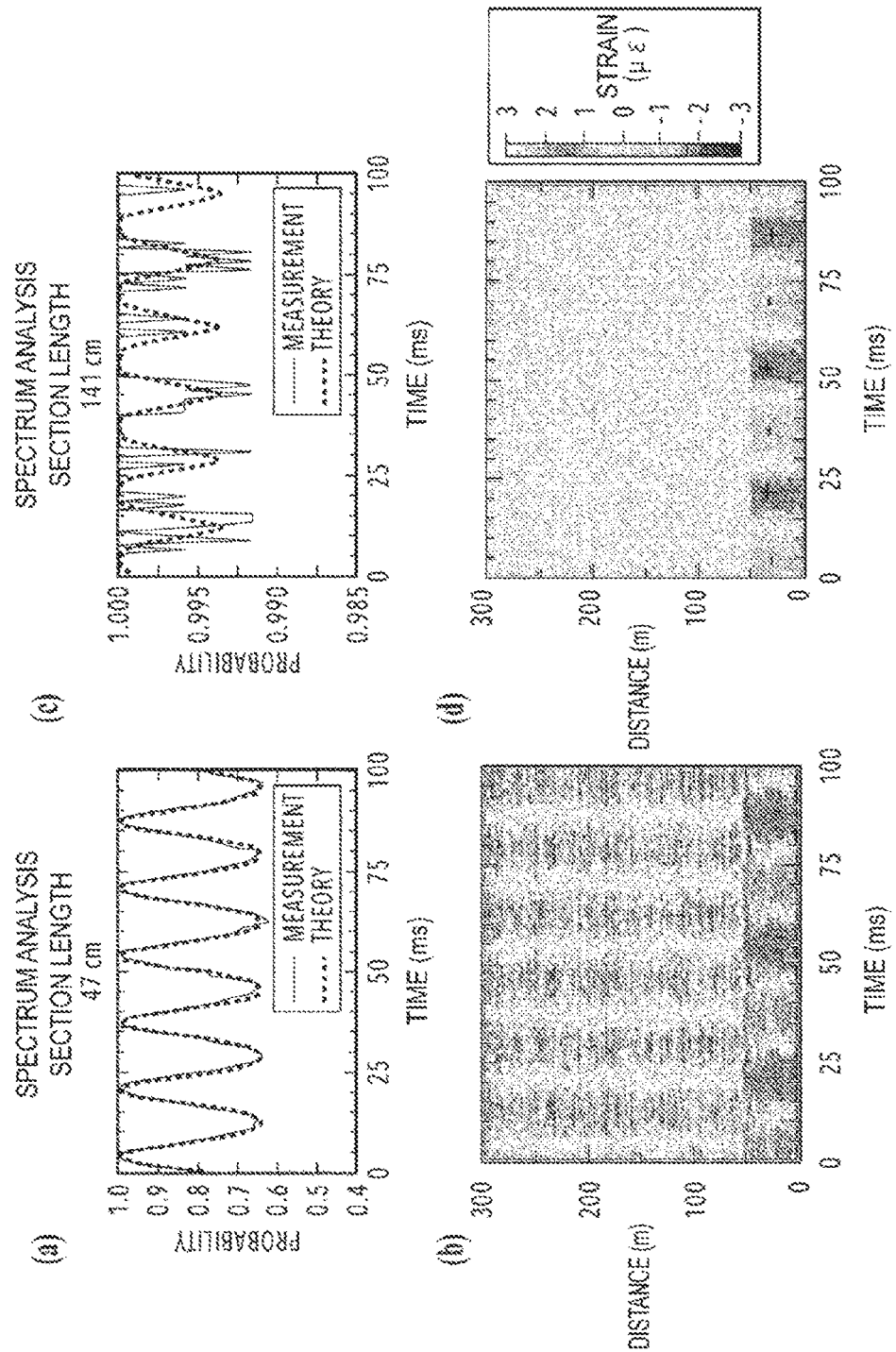
FIG. 15 is a diagram illustrating a vibration measurement result when two different N values are selected.

FIG. 15 is a diagram illustrating results of vibration measurement when two different N values have been selected. The vibration measurement results when the lengths N of the spectrum analysis sections are set to 47 cm and 141 cm, respectively, for the vibration system having the configuration illustrated in FIG. 14 are shown. It should be noted that any of the measurements is made "without distance offset arithmetic processing". FIG. 15(b) and FIG. 15(d) show time (ms) on a horizontal axis and a length of the sensing fiber on a vertical axis, are diagrams that are the same as FIG. 8, and show a vibrated state detected by the sensing fiber having a length of 300 m in FIG. 14. Although color is not displayed in FIG. 15, a spatial distribution and temporal fluctuation of an intensity of the strain are shown by shade of a region represented by a coordinate plane of the time on the horizontal axis and the distance on the vertical axis. In a graph of FIG. 15(d), the amount of strain (με) is shown by color at a right end, but the amount is shown by only shade for reference. Further, time positions of a +peak and a −peak of the strain of the vibration at 30 Hz (a period is 33 ms) in a range of a distance of 0 to 50 m in FIG. 15(d) are outlined.

FIG. 15(b) shows a vibrated state measured when the length N of the spectrum analysis section is set to 47 cm. The vibration at 30 Hz is observed in a section of distance 0 to 50 m, but a peak position fluctuates in a time axis direction, noise is observed, and the vibration is unclear. Here, referring to a simulation theoretical value in FIG. 13(a), a probability P of positions of $N_d$=26 cm and N=47 cm is about 0.7, and corresponds to a state in which the probability with which vibration can be measured correctly without the reference measurement is 0.7.

On the other hand, FIG. 15(d) shows a vibrated state measured when the length N of the spectrum analysis section is set to 141 cm. A vibration at 30 Hz in a section of a distance of 0 to 50 m is shown very clearly, and there are no fluctuation and noise in the time axis direction. Referring back to FIG. 13(a), a probability P of positions of $N_d$=26 cm and N=141 cm being outside a graph is substantially 1.0, and the probability with which vibration can be measured correctly without the reference measurement is 1.0, which corresponds to a state in which the vibration measurement can be performed 100% correctly. It can be understood from FIG. 15(b) and FIG. 15(d) that two measurement results in which N has been selected based on a theoretical probability distribution in the N-$N_d$ coordinate space illustrated in FIG. 13 correspond to a probability value P of a peak of a correlation value exceeding a noise level, and theoretical probability distribution in the N-$N_d$ coordinate space shows the tolerance to the distance offset $N_d$.

FIG. 15(a) and FIG. 15(c) show a probability of being analyzed as an "vibration-free state" as a measurement result over a section in which the length of the sensing fiber in the vibration-free state is 50 to 300 m. A horizontal axis indicates time (ms), a vertical axis indicates the probability of being analyzed as a "vibration-free state", and the probability of being analyzed as no vibration should be originally 1 in a section of 50 to 300 m.

Here, referring to FIG. 15(a) in which the length N of the spectrum analysis section is set to 47 cm, the probability of being analyzed as a "vibration-free state" periodically decreases to nearly 0.6. This corresponds to the fact that various levels of strain (με) are erroneously observed periodically and noise appears in the corresponding section of 50 to 300 m of FIG. 15(b). In FIG. 15(a) and FIG. 15(c), it can be seen that a measured value and a theoretical value are shown together, and when N=47 cm is set, false vibration is observed even in the "vibration-free state".

On the other hand, referring to FIG. 15(c) in which the length N of the spectrum analysis section is set to 141 cm, the probability of being analyzed as a "vibration-free state" does not fall below 0.99, and it can be said that the probability is substantially always close to 1.0. That is, a section in which the length of the sensing fiber in a vibration-free state is 50 to 300 m is correctly analyzed as the "vibration-free state" with a probability of substantially 100%. This corresponds to the fact that a strain level is displayed as 0 in a state in which there is substantially no noise in a corresponding section of 50 to 300 m in FIG. 15(d).

It can be understood from FIG. 15(a) and FIG. 15(c) that the two measurement results in which N has been selected based on theoretical probability distribution in the N-$N_d$ coordinate space illustrated in FIG. 13 correspond to the probability value P of the peak of the correlation value exceeding the noise level, and theoretical probability distribution in the N-$N_d$ coordinate space shows the tolerance to the distance offset $N_d$. Thus, when the length N of the spectrum analysis section is selected depending on theoretical probability distribution in the N-$N_d$ coordinate space obtained in FIG. 13, the dynamic strain can be measured correctly even when arithmetic processing of the offset distance is not performed without the reference measurement. The length N of the spectrum analysis section in this case is selected so that a probability of the correlation peak exceeding the noise level has a desired value or more close to 1, when the correlation measurement is performed on the spectrum of the reference measurement with respect to the value of the assumed distance offset $N_d$.

It was found that the vibration can be measured correctly without the reference measurement and arithmetic processing of the distance offset or the like by using the probability distribution of the correlation value peak level exceeding the noise level as an index of tolerance using two parameters N and $N_d$ shown in FIG. 13 and selecting an appropriate N. N at which the probability of the correlation peak exceeding the noise level when the correlation measurement is performed on the spectrum of the reference measurement becomes about 1 is selected with respect to the assumed distance offset $N_d$ based on the theoretical probability in the N-$N_d$ coordinate space, so that vibration measurement with high tolerance to the distance offset $N_d$ can be achieved.

A value of the above-described probability P can be set to a desired value close to 1 depending on accuracy required for the vibration measurement device or a vibration phenomenon of the measurement target. For example, in an environment in which high accuracy is required for a measured value, the length N of the spectrum analysis section is determined with respect to the assumed distance offset $N_d$, with the probability value P having a desired value being 0.99. Further, in an environment in which high accuracy is not required for a measured value, N can be determined from a wider range with respect to an assumed $N_d$, the probability value P having a desired value being 0.90.

As described above, the length N of the spectrum analysis section in which there is tolerance to the distance offset $N_d$ is set based on theoretical probability in the N-$N_d$ coordinate space, making it possible to greatly simplify the configurations of the vibration distribution measurement device and method of the present embodiment as compared to the first embodiment. In the flowchart of FIG. 10, a value in which there is the tolerance to the assumed distance offset $N_d$ is selected for the length N of the spectrum analysis section.

Thus, the strain measurement in the vibration distribution measurement device and method of the second embodiment can be performed by the following steps.

Step 0: First, an assumed maximum distance offset (distance deviation amount) $N_d$ is determined for a system under measurement including a vibration that is a target. When a maximum value of $N_d$ is known, $N_d$ thereof can be used. Thus, the distance offset $N_d$ may be actually measured using the configuration of the first embodiment as a preparatory step before steps to be described below.

Step I: A section in which the vibration that is a target is analyzed is designated.

Step II: The length N of the spectrum analysis section is set so that the probability of the correlation peak exceeding the noise level when the correlation measurement is performed on the spectrum of the reference measurement becomes about 1, based on the distribution of the probability P of the correlation value peak level exceeding the noise level, in which the two parameters N and Nd in FIG. 13 have been used, based on the determined Nd.

Step III: The distribution waveform of the backscattered light at the measurement time n is measured.

Step IV: The optical spectrum in the designated analysis section is analyzed.

Step V: Step III and step IV are repeated up to N times required to obtain the dynamic strain.

Step VI: A temporal change in the optical spectrum of the backscattered light is analyzed so that the amount of strain is computed, and a time waveform (vibration waveform) of the dynamic strain is obtained.

Step III above corresponds to step 10-1 in FIG. 10, step IV corresponds to step 10-2 in FIG. 10, step V corresponds to repetition of steps 10-1 and 10-2 in FIG. 10, and step VI corresponds to repetition of steps 10-3, 10-4 and 10-5, and step 10-6 in FIG. 10. Further, steps I to VI above are substantially the same as N repeated static strain measurements.

Thus, a method of measuring a dynamic strain of the present disclosure includes repeatedly supplying frequency swept lights to a sensing fiber, receiving backscattered light from the sensing fiber, combining local light, which is a part of a frequency swept light of the frequency swept lights, with the backscattered light to generate a beat signal, obtaining a backscattered light waveform from the beat signal, obtaining an optical spectrum in a freely selected spectrum analysis section of the backscattered light waveform, and obtaining a strain amount of the dynamic strain in a section of the sensing fiber corresponding to the spectrum analysis section, in which a length N of the spectrum analysis section is set with respect to an assumed distance deviation amount $N_d$ caused by the dynamic strain such that a probability of a correlation peak exceeding a noise level has a desired value when correlation measurement between a spectrum of reference measurement and the optical spectrum is performed, the desired value being approximate to 1.

Further, a configuration of the vibration distribution measurement device is not changed from the configuration of FIG. 1, and steps I to VI above is performed as processing operations different from the first embodiment in the analysis unit 11. Thus, a device that measures the dynamic strain of the present disclosure includes an optical circuit unit that repeatedly supplies frequency swept lights to a sensing fiber, receive backscattered light from the sensing fiber, and combine local light, which is a part of a frequency swept light of the frequency swept lights, with the backscattered light, and an optical reception and analysis unit that generates a beat signal from the local light and the backscattered light, obtain a backscattered light waveform from the beat signal, obtain an optical spectrum in a freely selected spectrum analysis section of the backscattered light waveform, and obtain a strain amount of the dynamic strain in a section of the sensing fiber corresponding to the spectrum analysis section, in which a length N of the spectrum analysis section is set with respect to an assumed distance deviation amount $N_d$ caused by the dynamic strain such that a probability of a correlation peak exceeding a noise level has a desired value when correlation measurement between a spectrum of reference measurement and the optical spectrum is performed, the desired value being approximate to 1.

As described above, the series of steps obtained by simplifying the flowcharts of FIGS. 9 and 10 of the present embodiment does not include arithmetic operation processing of the relevant distance offset. Thus, this is nothing but processing for measuring static strain in the OFDR. This becomes the same state as when an amount of static strain applied to the sensing fiber, which does not fluctuate with time, is measured by OFDR instead of the dynamic strain such as a vibration phenomenon. Thus, it becomes possible to measure "the dynamic strain" which is a fluctuation of temporal strain by simply repeating measurement of "static strain" periodically. When the dynamic strain is steady, once the maximum value of the distance offset $N_d$ is actually measured and N is determined to be a preparatory step described in step 0 described above, a distance offset processing step can be omitted and thus the measurement time can be greatly shortened. That is, a device and a measuring method that accurately measure vibration at a designated position without using digital signal processing to compensate for distance fluctuation become possible.

The probability distribution of the correlation value peak level exceeding the noise level, in which the two parameters N and $N_d$ shown in FIG. 13 have been used, shows an example in which N is set to 80 cm or more when $N_d$=10 cm is assumed in the measurement of the target. In the N-$N_d$ coordinate space, this can be specified as a region (boundary) in which the probability value P becomes about 1. That is, the region is a region in which P(N, $N_d$)=1 in the probability value P given in FIG. 13(a).

As described in detail above, the vibration distribution measurement device of the present disclosure provides a device and a measuring method that accurately measure vibration at a designated position without using digital signal processing to compensate for distance fluctuation.

INDUSTRIAL APPLICABILITY

The present invention can be used for fiber sensing.
The invention claimed is:
1. A device configured to measure dynamic strain of a sensing fiber, the device comprising:
an optical circuit unit configured to repeatedly supply frequency swept lights to the sensing fiber,
receive backscattered light from the sensing fiber, and
combine local light, the local light being a part of a frequency swept light of the frequency swept lights, with the backscattered light; and
an optical reception and analysis unit configured to generate a beat signal from the local light and the backscattered light,
execute Fourier transform on the beat signal to obtain a backscattered light waveform,
execute Fourier transform in a freely selected spectrum analysis section of the backscattered light waveform to obtain an optical spectrum, and
obtain, based on the amount of spectrum shift between a spectrum obtained in reference measurement and a spectrum obtained from the backscattered light for one sweep of the frequency swept lights, a strain amount of the dynamic strain in a section of the sensing fiber corresponding to the spectrum analysis section,
wherein a length of the spectrum analysis section is set to be larger than a distance deviation amount $N_d$ of the spectrum analysis section caused by frequency modulation due to the dynamic strain.

2. The device according to claim 1, wherein the distance deviation amount is obtained by $N_d = T \cdot v_{offset}$, where T is a measurement time using the frequency swept light and $v_{offset}$ is the amount of the frequency modulation caused by vibration.

3. The device according to claim 1, wherein the dynamic strain is a temporal change in the strain amount in a sensing fiber section and is obtained from the strain amount for each of the sweeps of the frequency swept lights that are repeatedly supplied.

4. The device according to claim 1, wherein the reference measurement is based on a spectrum in a state where there is no dynamic strain in the sensing fiber.

5. A method of measuring dynamic strain of a sensing fiber, the method comprising:
repeatedly supplying frequency swept lights to the sensing fiber;
receiving backscattered light from the sensing fiber;
combining local light, the local light being a part of a frequency swept light of the frequency swept lights, with the backscattered light to generate a beat signal;
executing Fourier transform on the beat signal to obtain a backscattered light waveform;
executing Fourier transform in a freely selected spectrum analysis section of the backscattered light waveform to obtain an optical spectrum; and
obtaining, based on the amount of spectrum shift between a spectrum obtained in reference measurement and a spectrum obtained from the backscattered light for one sweep of the frequency swept lights, a strain amount of the dynamic strain in a section of the sensing fiber corresponding to the spectrum analysis section,
wherein a length of the spectrum analysis section is set to be larger than a distance deviation amount $N_d$ of the spectrum analysis section caused by frequency modulation due to the dynamic strain.

6. The method according to claim 5, wherein the distance deviation amount is obtained by $N_d = T \cdot v_{offset}$, where T is a measurement time using the frequency swept light and $v_{offset}$ is the amount of the frequency modulation caused by vibration, and the dynamic strain is a temporal change in the strain amount in a sensing fiber section and is obtained from the strain amount for each of the sweeps of the frequency swept lights that are repeatedly supplied.

7. A device configured to measure dynamic strain, the device comprising:
an optical circuit unit configured to repeatedly supply frequency swept lights to a sensing fiber,
receive backscattered light from the sensing fiber, and
combine local light, the local light being a part of a frequency swept light of the frequency swept lights, with the backscattered light; and
an optical reception and analysis unit configured to generate a beat signal from the local light and the backscattered light,
obtain a backscattered light waveform from the beat signal,
obtain an optical spectrum in a freely selected spectrum analysis section of the backscattered light waveform, and
obtain a strain amount of the dynamic strain in a section of the sensing fiber corresponding to the spectrum analysis section,
wherein a length N of the spectrum analysis section is set with respect to an assumed distance deviation amount $N_d$ caused by the dynamic strain such that a probability of a correlation peak exceeding a noise level has a desired value when correlation measurement between a spectrum of reference measurement and the optical spectrum is performed, the desired value being approximate to 1.

8. The device according to claim 7, wherein the probability is expressed in an $N_d$-N coordinate space, the $N_d$-N coordinate space being acquired based on reference measurement and trial measurement, indicating the probability of the correlation peak exceeding the noise level, and the length N is in an area where the desired value is given in the $N_d$-N coordinate space.

9. A method of measuring dynamic strain, the method comprising:
  repeatedly supplying frequency swept lights to a sensing fiber;
  receiving backscattered light from the sensing fiber;
  combining local light, the local light being a part of a frequency swept light of the frequency swept lights, with the backscattered light to generate a beat signal;
  obtaining a backscattered light waveform from the beat signal;
  obtaining an optical spectrum in a freely selected spectrum analysis section of the backscattered light waveform; and
  obtaining a strain amount of the dynamic strain in a section of the sensing fiber corresponding to the spectrum analysis section,
  wherein a length N of the spectrum analysis section is set with respect to an assumed distance deviation amount $N_d$ caused by the dynamic strain such that a probability of a correlation peak exceeding a noise level has a desired value when correlation measurement between a spectrum of reference measurement and the optical spectrum is performed, the desired value being approximate to 1.

10. The method according to claim 9, wherein the probability is expressed in an $N_d$-N coordinate space, the $N_d$-N coordinate space being acquired based on reference measurement and trial measurement, indicating the probability of the correlation peak exceeding the noise level, and the length N is selected from an area where the desired value is given in the $N_d$-N coordinate space.

\* \* \* \* \*